(12) United States Patent
Huh et al.

(10) Patent No.: US 9,871,418 B2
(45) Date of Patent: *Jan. 16, 2018

(54) SENSORLESS ELECTRIC MACHINE

(71) Applicant: GENERAL ELECTRIC COMPANY, Schenectady, NY (US)

(72) Inventors: Kum Kang Huh, Niskayuna, NY (US); Patel Bhageerath Reddy, Niskayuna, NY (US); Ayman Mohamed Fawzi El-Refaie, Niskayuna, NY (US); Patrick Lee Jansen, Scotia, NY (US); Roy David Schultz, Erie, PA (US); Lembit Salasoo, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/974,848

(22) Filed: Dec. 18, 2015

(65) Prior Publication Data

US 2016/0105064 A1 Apr. 14, 2016

Related U.S. Application Data

(63) Continuation-in-part of application No. 14/559,037, filed on Dec. 3, 2014, which is a continuation-in-part
(Continued)

(51) Int. Cl.
*H02K 1/27* (2006.01)
*H02K 1/26* (2006.01)
(Continued)

(52) U.S. Cl.
CPC .............. *H02K 1/246* (2013.01); *H02K 1/223* (2013.01); *H02K 21/46* (2013.01); *H02K 29/12* (2013.01); *H02K 1/276* (2013.01)

(58) Field of Classification Search
CPC ........ H02K 1/223; H02K 1/246; H02K 21/04; H02K 21/042
(Continued)

(56) References Cited

U.S. PATENT DOCUMENTS 4,139,790 A 2/1979 Steen
4,168,459 A 9/1979 Roesel, Jr.
(Continued)

FOREIGN PATENT DOCUMENTS

CN 102005883 A 4/2011
EP 1689066 A2 8/2006
(Continued)

OTHER PUBLICATIONS

A. Faggion et al, "Ringed-Pole Permanent-Magnet Synchronous Motor for Position Sensorless Drives," IEEE Transactions on Industry Applications, vol. 47, No. 4, Jul./Aug. 2011, pp. 1759-1766.
(Continued)

*Primary Examiner* — Thomas Truong
(74) *Attorney, Agent, or Firm* — Patrick K. Chakrabarti

(57) ABSTRACT

A rotor component that comprises a rotor circuit configured for use with either an interior permanent magnet (IPM) machine or a synchronous reluctance machine (SRM) that includes a pole circuit made of a conductive, non-magnetic material and has a midpoint that substantially aligns with a d-axis of the IPM or SRM. An electric machine with a similar rotor component therein or having a loop or ring of a conductive, non-magnetic material that is substantially concentric about a d-axis of the electric machine.

6 Claims, 17 Drawing Sheets

Related U.S. Application Data of application No. 13/666,283, filed on Nov. 1, 2012, now Pat. No. 9,093,878.

(51) Int. Cl.
  *H02K 1/24* (2006.01)
  *H02K 21/46* (2006.01)
  *H02K 29/12* (2006.01)
  *H02K 1/22* (2006.01)

(58) Field of Classification Search
  USPC .......................................................... 310/181
  See application file for complete search history.

(56) References Cited

U.S. PATENT DOCUMENTS

| | | | |
|---|---|---|---|
| 4,365,180 A | 12/1982 | Licata et al. | |
| 4,454,438 A * | 6/1984 | Yamashita | H02K 21/46 |
| | | | 310/156.81 |
| 4,490,638 A | 12/1984 | Lind | |
| 4,631,435 A | 12/1986 | McCarty | |
| 4,670,696 A | 6/1987 | Byrne et al. | |
| 5,515,395 A | 5/1996 | Tsutsui | |
| 5,565,752 A | 10/1996 | Jansen et al. | |
| 5,585,709 A | 12/1996 | Jansen et al. | |
| 5,886,440 A | 3/1999 | Hasebe et al. | |
| 5,886,498 A | 3/1999 | Sul et al. | |
| 5,936,323 A | 8/1999 | Shibukawa et al. | |
| 6,058,596 A | 5/2000 | Jansen et al. | |
| 6,069,467 A | 5/2000 | Jansen | |
| 6,137,258 A | 10/2000 | Jansen | |
| 6,388,353 B1 | 5/2002 | Liu et al. | |
| 6,388,420 B1 | 5/2002 | Jansen et al. | |
| 6,639,380 B2 | 10/2003 | Sul et al. | |
| 6,707,209 B2 | 3/2004 | Crapo et al. | |
| 6,763,622 B2 | 7/2004 | Schulz et al. | |
| 6,801,011 B2 | 10/2004 | Ide | |
| 6,822,418 B2 | 11/2004 | Harke | |
| 6,847,144 B1 | 1/2005 | Luo | |
| 6,867,524 B2 | 3/2005 | Liang | |
| 6,874,221 B2 | 4/2005 | Jansen et al. | |
| 6,876,115 B2 | 4/2005 | Takahashi et al. | |
| 6,894,454 B2 | 5/2005 | Patel et al. | |
| 6,924,617 B2 | 8/2005 | Schulz et al. | |
| 6,967,461 B1 | 11/2005 | Markunas et al. | |
| 6,975,050 B2 | 12/2005 | Cleanthous et al. | |
| 7,034,423 B2 | 4/2006 | Crapo et al. | |
| 7,045,988 B2 | 5/2006 | Ha et al. | |
| 7,088,077 B2 | 8/2006 | Nagashima et al. | |
| 7,190,130 B2 | 3/2007 | Wogari et al. | |
| 7,245,054 B1 | 7/2007 | Walls et al. | |
| 7,342,338 B2 | 3/2008 | Miyazaki et al. | |
| 7,348,749 B2 | 3/2008 | Ide et al. | |
| 7,541,710 B2 | 6/2009 | Nemoto et al. | |
| 7,679,308 B2 | 3/2010 | Tomigashi | |
| 7,768,220 B2 | 8/2010 | Schulz et al. | |
| 7,902,710 B2 | 3/2011 | Han et al. | |
| 7,902,711 B2 | 3/2011 | Blissenbach et al. | |
| 7,969,058 B2 | 6/2011 | Rahman et al. | |
| 8,018,109 B2 | 9/2011 | Leonardi et al. | |
| 8,035,273 B2 | 10/2011 | Ionel et al. | |
| 8,067,872 B2 | 11/2011 | Pedersen et al. | |
| 8,129,881 B2 | 3/2012 | Hoesle | |
| 8,217,545 B2 | 7/2012 | Kawasaki et al. | |
| 8,228,013 B2 | 7/2012 | Liu et al. | |
| 8,247,940 B2 | 8/2012 | Hino et al. | |
| 8,378,534 B2 | 2/2013 | Houle et al. | |
| 8,405,269 B2 | 3/2013 | Spaggiari | |
| 8,436,504 B2 | 5/2013 | Liang et al. | |
| 8,508,094 B2 | 8/2013 | Matt et al. | |
| 8,536,748 B2 | 9/2013 | Liang et al. | |
| 9,093,878 B2 | 7/2015 | Huh et al. | |
| 2002/0140307 A1 | 10/2002 | Yanashima et al. | |
| 2003/0209950 A1 | 11/2003 | Biais et al. | |
| 2004/0256944 A1 | 12/2004 | Kaneko | |
| 2005/0121990 A1 | 6/2005 | Kaneko | |
| 2005/0140236 A1 * | 6/2005 | Jeong | H02K 1/2766 |
| | | | 310/156.53 |
| 2008/0129243 A1 | 6/2008 | Nashiki | |
| 2009/0026872 A1 | 1/2009 | Tomohara et al. | |
| 2009/0184598 A1 * | 7/2009 | Nakano | G01D 5/2046 |
| | | | 310/156.78 |
| 2009/0315505 A1 | 12/2009 | Denk et al. | |
| 2010/0127584 A1 | 5/2010 | Gottfried | |
| 2010/0156205 A1 | 6/2010 | Davis et al. | |
| 2010/0301697 A1 | 12/2010 | Takahashi et al. | |
| 2011/0074231 A1 | 3/2011 | Soderberg | |
| 2011/0080068 A1 | 4/2011 | Dawson et al. | |
| 2011/0304235 A1 * | 12/2011 | Hashiba | H02K 1/02 |
| | | | 310/156.76 |
| 2012/0062160 A1 | 3/2012 | Yang et al. | |
| 2012/0235533 A1 | 9/2012 | Tanaka et al. | |
| 2013/0093369 A1 | 4/2013 | Leonardi et al. | |
| 2013/0119810 A1 | 5/2013 | Aoyama | |
| 2013/0154426 A1 | 6/2013 | Melfi et al. | |
| 2014/0117791 A1 | 5/2014 | Fiseni et al. | |
| 2015/0069863 A1 | 3/2015 | Papini et al. | |
| 2015/0084471 A1 | 3/2015 | Huh et al. | |

FOREIGN PATENT DOCUMENTS

| | | |
|---|---|---|
| EP | 1850456 A2 | 10/2007 |
| JP | 62193537 A | 8/1987 |
| JP | 2002238194 A | 8/2002 |
| JP | 2004248443 A | 9/2004 |
| JP | 2011055641 A | 3/2011 |
| RU | 2167481 C1 | 5/2001 |
| RU | 2406209 C2 | 12/2010 |
| RU | 119541 U1 | 8/2012 |
| WO | 8705164 A1 | 8/1987 |
| WO | 2012129799 A1 | 10/2012 |

OTHER PUBLICATIONS

PL Search Report issued in connection with corresponding Application No. P410191 dated Mar. 4, 2015.

Ha et al., "Physical Understanding of High Frequency Injection Method to Sensorless Drives of an Induction Machine", Industry Applications Conference, Conference Record of the 2000 IEEE, Rome, vol. No. 3, pp. 1802-1808, 2000.

Jang et al., "Sensorless Drive of Surface-mounted Permanent-magnet Motor by High-Frequency Signal Injection Based on Magnetic Saliency", IEEE Transactions on Industry Applications, vol. No. 39, Issue No. 4, pp. 1031-1039, Jul.-Aug. 2003.

Han et al., "Design Tradeoffs between Stator Core Loss and Torque Ripple in IPM Machines", IEEE Industry Applications Society Annual Meeting, Edmonton, pp. 1-8, Oct. 5-9, 2008.

Cupertino et al., "Sensorless Control of Linear Tubular Permanent Magnet Synchronous Motors Using Pulsating Signal Injection", IEEE Industry Applications Society Annual Meeting, IEEE, Edmonton, pp. 1-8, Oct. 5-9, 2008.

Wang et al., "Cogging Torque Reduction in Interior Permanent Magnet Brushless DC Motor with Flux-Concentration Type Rotor", Electrical Machines and Systems, ICEMS, International Conference Tokyo, IEEE, pp. 1-6, Nov. 15-18, 2009.

Fu et al., "The Design of Interior Permanent Magnet brushless motor control system based on finite element method", Informatics in Control, Automation and Robotics (CAR), 2nd International Asia Conference, Wuhan, IEEE, vol. No. 3, pp. 130-133, Mar. 6-7, 2010.

Kang, "Sensorless Control of Permanent Magnet Motors", Control Engineering, vol. No. No. 57, Issue No. 4, Apr. 2010.

Yang et al., "Surface Permanent Magnet Synchronous Machine Design for Saliency-Tracking Self-Sensing Position Estimation at Zero and Low Speeds", IEEE Energy Conversion Congress and Exposition (ECCE), pp. 3493-3500, Sep. 12-16, 2010.

Barcaro et al., "Predicted and Experimental Anisotropy of a Dual Three-Phase Interior Permanent Magnet Motor for Sensorless Rotor Position Control", Power Electronics, Machines and Drives (PEMD 2012), 6th IET International conference, Bristol, pp. 1-6, Mar. 27-29, 2012.

(56) References Cited

OTHER PUBLICATIONS

Wang et al., "A Permanent Magnet Integrated Starter Generator for Electric Vehicle Onboard Range Extender Application", IEEE Transactions on Magnetics, vol. No. 48, Issue No. 4, pp. 1625-1628, Apr. 2012.

Bianchi et al., "Analysis and Experimental Tests of the Sensorless Capability of a Fractional-Slot Inset PM Motor", Sensorless Control for Electrical Drives (SLED), IEEE Symposium,Milwaukee, WI, IEEE, pp. 1-6, Sep. 21-22, 2012.

Marcie, "Comparison of Induction Motor and Line-Start IPM Synchronous Motor Performance in a Variable-Speed Drive", IEEE Transactions on Industry Applications, vol. No. 48, Issue No. 6, pp. 2341-2352, Nov./Dec. 2012.

Faggion et al., "Sensorless Capability of Fractional-Slot Surface-Mounted PM Motors", IEEE Transactions on Industry Applications, vol. No. 49, Issue No. 3, pp. 1325-1332, May/Jun. 2013.

Fei et al., "Comparison of Cogging Torque Reduction in Permanent Magnet Brushless Machines by Conventional and Herringbone Skewing Techniques", IEEE Transactions on Energy Conversion, vol. No. 28, Issue No. 3, pp. 664-674, Sep. 2013.

PCT Search Report and Written Opinion issued in connection with related Application No. PCT/US2014/053386 dated Jun. 3, 2015.

Australian Patent Examination Report issued in connection with related AU Application No. 2014259500 dated Jun. 18, 2015.

Canadian Office Action issued in connection with related CA Application No. 2869835 dated Jan. 5, 2016.

Unofficial English translation of Kazakhstan Office Action issued in connection with related KZ Application No. 2014/2531.1 dated Jan. 7, 2016.

U.S. Non-Final Office Action issued in connection with related U.S. Appl. No. 14/019,630, dated Feb. 25, 2016.

U.S. Final Office Action issued in connection with related U.S. Appl. No. 14/019,630, dated Sep. 15, 2016.

U.S. Non-Final Office Action issued in connection with related U.S. Appl. No. 14/313,380, dated Dec. 15, 2016.

U.S. Non-Final Office Action issued in connection with related U.S. Appl. No. 14/085,953, dated Jan. 11, 2017.

U.S. Notice of Allowance issued in connection with related U.S. Appl. No. 14/019,630, dated Jan. 23, 2017.

Unofficial English Translation of Chile Office Action issued in connection with related CL Application No. 201402963 dated May 11, 2017.

U.S. Final Office Action issued in connection with related U.S. Appl. No. 14/085,953, dated May 24, 2017.

U.S. Final Office Action issued in connection with related U.S. Appl. No. 14/313,380, dated Jun. 13, 2017.

* cited by examiner

SENSORLESS ELECTRIC MACHINE

CROSS REFERENCE TO RELATED APPLICATIONS

This Continuation-In-Part (C.I.P.) application claims benefit to both the Dec. 3, 2014 filing date of U.S. application Ser. No. 14/559,037 (Entitled: SENSORLESS ELECTRIC MACHINE) and, in turn, to the Nov. 1, 2012 filing date of U.S. Pat. No. 9,093,878 (Entitled: SENSORLESS ELECTRIC MACHINE). The contents of both are incorporated herein by reference in their entirety.

BACKGROUND OF THE INVENTION

The present invention relates generally to electric machines and more particularly to a sensorless electric machine, a component thereof, vehicles that employ the component and electric machine, and methods of making and operating the same.

With an electric machine, be it an interior permanent magnet (IPM) machine, permanent magnet (PM) assisted synchronous reluctance machine (SRM), or an SRM, position is a critical informational element for torque control at and near zero excitation frequency. Typically, an encoder, tachometer, or resolver is used with electric machines as the position sensor.

However, the position sensor (e.g., encoder) along with its cabling and interface electronics contributes a significant portion of the motor drive system cost and overall complexity and is often a major reliability concern. Since the advent of the high frequency injection method for zero frequency encoderless control, encoderless controls have seen great improvements but none have found success in recovering the full, or near full, torque capability of the machine. This is due to loss of small signal saliency at high-load levels for the machine.

Accordingly, there is an ongoing need for improvement of current electric machine technologies that address complexity, cost, efficiency, and/or performance.

BRIEF DESCRIPTION

The present invention overcomes at least some of the aforementioned drawbacks by providing improvements that allow electric machines, such as IPM motors to operate with full torque control without the need for any position sensor(s) (e.g., encoder). More specifically, the present invention is directed to a machine component and a machine that, when employing the component, is able to operate as a sensorless electric machine. A vehicle that uses one or more electric machines and methods of making and operating such an electric machine are also disclosed.

Therefore, in accordance with one aspect of the invention, a rotor component comprises: a rotor circuit configured for use with one of an interior permanent magnet (IPM) machine and a synchronous reluctance machine (SRM), the rotor circuit comprising: at least one pole circuit, wherein the at least one pole circuit are made of a conductive, non-magnetic material and a midpoint of the least one pole circuit substantially aligns with a d-axis of the IPM or SRM.

In accordance with another aspect of the invention, an electric machine comprises: a rotor core; a stator configured with a plurality of stationary windings therein; a plurality of openings disposed within the rotor core; and a rotor circuit structure comprising at least one pole circuit disposed in a predetermined location, wherein said predetermined location is such that a midpoint of the least one pole circuit substantially aligns with a d-axis of the electric machine.

In accordance with another aspect of the invention, an electric machine comprises: a rotor core; a stator configured with a plurality of stationary windings therein; a plurality of openings disposed within the rotor core; a rotatable shaft therethrough; and a rotor circuit structure comprising at least one loop or ring of a conductive, non-magnetic material, wherein said at least one loop or ring is substantially concentric about a d-axis of the electric machine.

Various other features and advantages of the present invention will be made apparent from the following detailed description and the drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
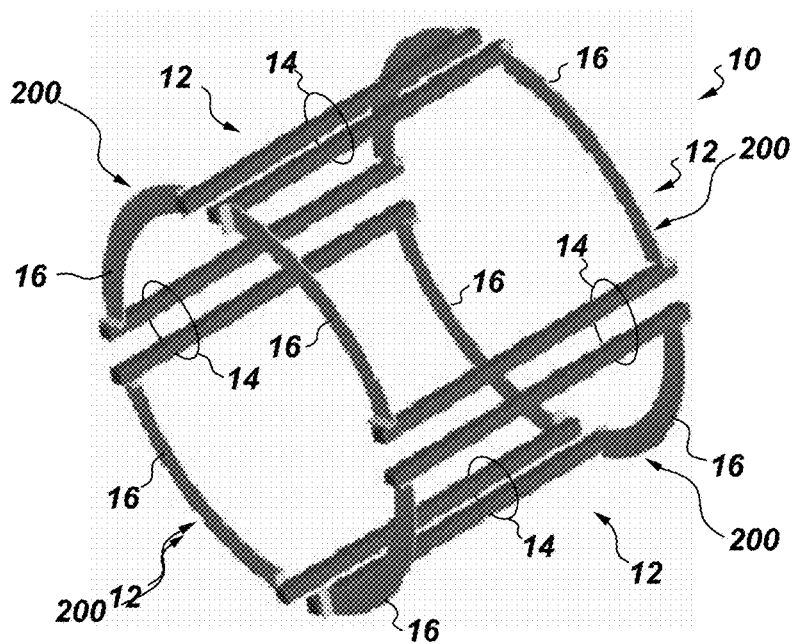
FIG. 1 is a perspective view of a rotor circuit structure component according to an embodiment of the present invention.

Unless defined otherwise, technical and scientific terms used herein have the same meaning as is commonly understood by one of ordinary skill in the art with respect to the presently disclosed subject matter. The terms "first", "second", and the like, as used herein do not denote any order, quantity, or importance, but rather are used to distinguish one element from another. The terms "a", "an", and "the" do not denote a limitation of quantity, but rather denote the presence of at least one of the referenced item, and the terms "front", "back", "bottom", and/or "top", unless otherwise noted, are used for convenience of description only, and are not limited to any one position or spatial orientation.

If ranges are disclosed, the endpoints of all ranges directed to the same component or property are inclusive and independently combinable (e.g., ranges of "up to about 25 wt. %," is inclusive of the endpoints and all intermediate values of the ranges of "about 5 wt. % to about 25 wt. %," etc.). The modified "about" used in connection with a quantity is inclusive of the stated value and has the meaning dictated by the context (e.g., includes the degree of error associated with measurement of the particular quantity). Accordingly, the value modified by the term "about" is not necessarily limited only to the precise value specified.

As used herein, the terms "D-axis", "d-axis", or "direct axis" of the rotor means the axis that is aligned with the center of the magnetic pole of the rotor.

As used herein, the terms "Q-axis", "q-axis", or "quadrature axis" of the rotor means the axis that is aligned with the mid-point of the two magnetic poles of the rotor.

As used herein, the term "Pole Circuit" means one or more circuits that is affiliated with one pole of the electric machine. The one or more circuits may comprise one ring/loop, multiple rings/loops, one loop/ring of a cage, or one loop/ring of a cage with one or more inner rings/loops. The cage may be a shifted or non-shifted cage. Rings/loops may be shifted or non-shifted.

As used herein, the term "Shifted Cage" means one or more connected rings or loops wherein a rotor conductor (or if more than one rotor conductor are adjacent, then a midpoint between the plurality of adjacent rotor conductors) is not aligned with a q-axis of the machine, but instead is shifted by a distance from the q-axis. Contrastingly, a cage that is not shifted has a rotor conductor (or if more than one rotor conductor are adjacent, then a midpoint between the plurality of adjacent rotor conductors) that is aligned with the q-axis of the machine.

Aspects of the present invention have been shown to offer advantages over previous electric machine constructs. Aspects of the present invention provide design features for an electric machine (e.g., IPM motor) that enables full torque control without the use of any position sensor. An aspect of the present invention includes the use of a component, termed herein a special rotor structure that introduces magnetic saliency for high frequency excitation, wherein this high frequency excitation can be used for sensorless (e.g., encoderless) motor control. The rotor structure introduces electrical circuits (shorted circuit, closed circuit with passive or active elements) to specific orientation of the rotor so that it couples with the stator winding magnetically. The position of the rotor is measured by applying high frequency carrier voltage to the stator and by indirectly measuring the current of the rotor, by measuring the (reflected) high frequency carrier current response in the stator. If the rotor circuit is aligned in phase with the high frequency injection the impedance of the motor is reduced. This variation of impedance is used to track rotor position. As a result, small signal saliency up to necessary loading level is introduced and maintained without impact on electric machine performance, efficiency, and reliability.

Referring to FIG. 1 a rotor circuit or electrical component 10 incorporating aspects of the present invention is shown. The component 10 may comprise one or more rotor conductors (e.g., rotor bars 14) connected to one or more connection elements 16. As shown, the rotor bars 14 are substantially longitudinal in configuration. As will be discussed herein the component 10 and the rotor bars 14 and connection elements 16 are configured so as to substantially surround permanent magnets 40 located in an electric machine 100. In this manner two or more rotor bars 14 are connected to two or more connection elements 16 such that they define a loop or ring 12. While the embodiment in FIG. 1 clearly shows a quantity of four rings 12 each ring 12 comprising two rotor bars 14 and two connection elements 16, other quantities and configurations of elements of the component 10 are suitable without departing from the present invention. For example, the component 10 may comprise four rotor bars 14 and a plurality of connection elements 16 are either end of the component 10, thereby defining a cage 13. Similarly, in another embodiment, the component 10 may comprise a plurality of loops or rings 12, wherein each ring 12 comprises four rotor bars 14 and two connection elements 16. In still other embodiments, the ring(s) 12 and/or cage 13 may comprise virtually any quantity of conductors and/or connection elements.

The rotor bars 14 and connection elements 16 may be made of any suitable conductive, non-magnetic material, or combinations thereof. By example but not limitation, the rotor bars 14 and connection elements 16 may be castings made of aluminum, copper, alloys of copper or aluminum, or other suitable material or combination of materials.

It should be noted that although several of the embodiments discussed herein discuss the use of rotor bars, other conductive elements may be used in the component 10 without departing from the invention. For example, any suitable rotor conductor may be substituted in lieu of the rotor bars 14 that are discussed herein for the various embodiments. Other conductive elements for use in lieu of the rotor bars 14 and/or the connection elements 16 include, but are not limited to, one or more of multistranded bars, multi-stranded wire, litz wire, and combinations thereof.

Similarly, the rotor bar 14 has a cross-sectional shape that is suitable to address design factors including skin effect, cooling surface, structural strength, EM fitness, and the like. Suitable shapes for the cross-section of the rotor bar include a circle, square, rectangle, and the like.

Figure 2:
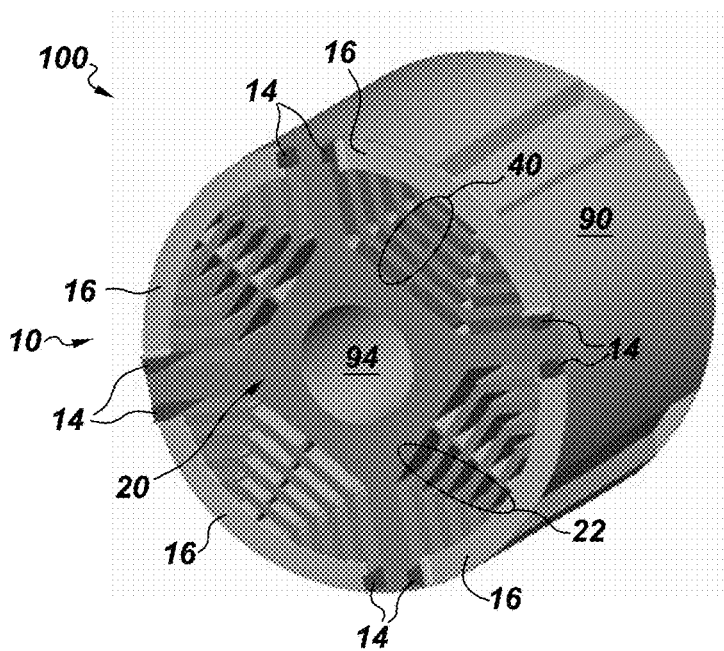
FIG. 2 is a perspective view of rotor core of an electric machine incorporating a rotor circuit structure component according to an embodiment of the present invention.

The end perspective view of another embodiment of the component 10 located in rotor portion of a motor 100 is shown in FIG. 2. The motor 100 includes a plurality of rotor core laminations 20 stacked so as to form a rotor core 90. As shown, in the end view where a cover plate is omitted for illustrative purposes only so as to allow a first rotor core lamination 20 to be viewed. The rotor core lamination 20 includes a plurality of openings 22. Permanent magnets 40 may be located within the plurality of openings 22. For illustrative purposes only the permanent magnets 40 are shown disposed in only one set (e.g., at one pole) of openings 22. The other three sets of openings 22 (i.e., four-pole machine) are shown without permanent magnets 40 therein. At the center of the rotor core lamination 20 is a shaft opening 94 configured to receive a rotatable shaft (not shown). As depicted, the component 10 is similar to the embodiment shown in FIG. 1 and comprises a quantity of four rings or loops 12, each comprising two rotor bars 14 connected to two connection elements 16. In this manner, two of the rotor bars 14 and the two connection elements 16 are interconnected so as to form a rotor ring or loop 12. Four rotor rings or loops 12 are formed as part of the component 10 in this manner so as to match the quantity of poles (i.e., four) in the embodiment of the motor shown 100.

Figure 3A:
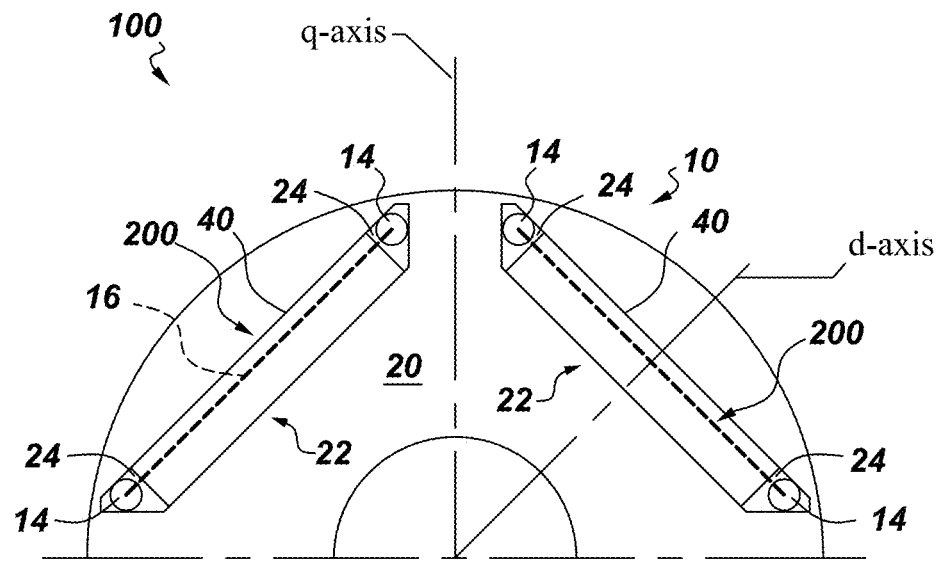
FIG. 3A is a top view of a portion of a rotor lamination and rotor circuit structure component according to an embodiment of the present invention.
Figure 3B:
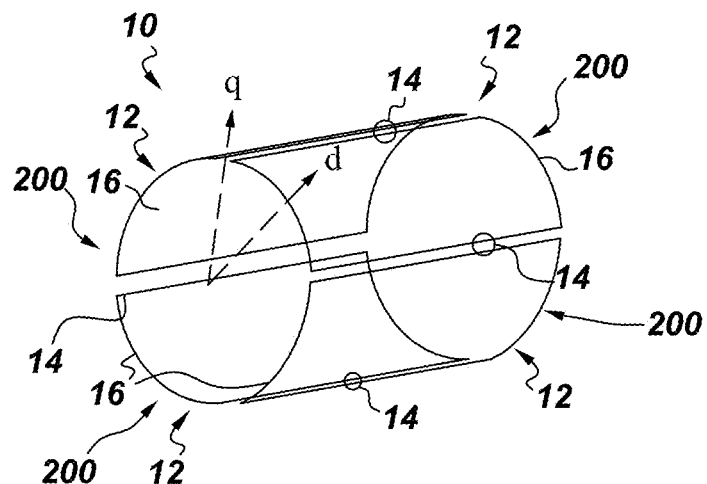
FIG. 3B is a schematic perspective diagram of the rotor circuit structure component in FIG. 3A according to an embodiment of the present invention.

Referring collectively to FIGS. 3A and 3B, a top view of a portion of a rotor lamination 20 portion of an electric machine 100 with a component 10 and a schematic diagram of a perspective view of the component 10 from FIG. 3A are shown respectively. FIG. 3A depicts a rotor lamination 20 of a single layer, four-pole IPM 100 having straight permanent magnets 40 therein. FIG. 3B depicts a rotor component 10 that may be termed a four-loop configuration. As shown and known in the art, the rotor lamination 20 includes a plurality of openings 22 that, depending on the particular embodiment, may have disposed therein one or more permanent magnets 40. Once the permanent magnets 40 are disposed within the openings 22 there typically remains adjacent to either end of the permanent magnets 40 an opening, or remaining opening, 24. For illustrative purposes only, the stator and/or stator windings are not shown that substantially surround the rotor component.

The plurality of rotor bars 14 are disposed in the plurality of openings 24 longitudinally through the stack of rotor laminations 20. At or near either end of the stack of rotor laminations 20 are connection elements 16 that are connected to both ends of the rotor bars 14. In this manner, the component 10 embodiment in FIG. 3B has four rotor loops 12 each constructed of two rotor bars 14 and two connection elements 16, thereby matching the quantity of poles (i.e., four) for the particular machine 100.

Figure 4A:
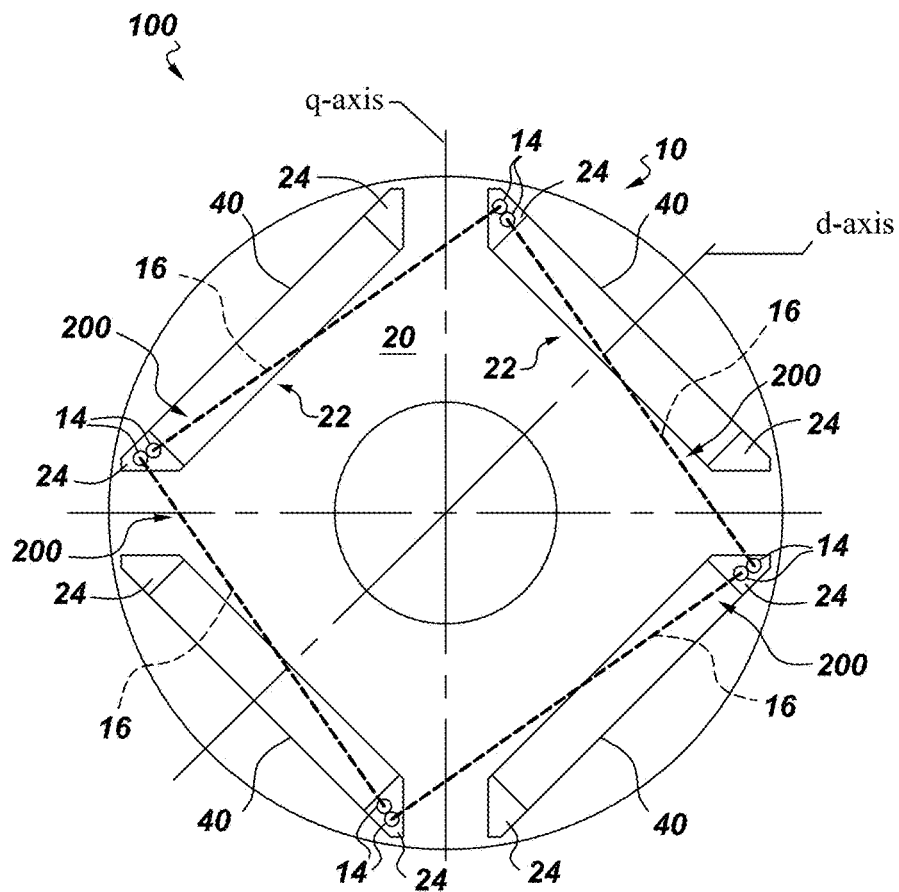
FIG. 4A is a top view of a portion of a rotor lamination and rotor circuit structure component according to another embodiment of the present invention.
Figure 4B:
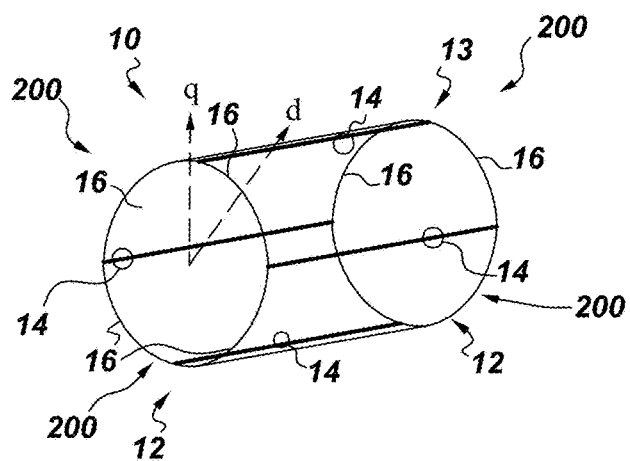
FIG. 4B is a schematic perspective diagram of the rotor circuit structure component in FIG. 4A according to an embodiment of the present invention.

Referring collectively to FIGS. 4A and 4B, a top view of a portion of a rotor lamination 20 portion of an electric machine 100 with a component 10 and a schematic diagram of a perspective view of the component 10 from FIG. 4A are shown respectively. FIG. 4A depicts a rotor lamination 20 of a single layer, four-pole IPM 100 having straight permanent magnets 40 therein. FIG. 4B depicts a rotor component 10 that may be termed a four-loop, shifted-ring configuration. As shown and known in the art, the rotor lamination 20 includes a plurality of openings 22 that, depending on the particular embodiment, may have disposed therein one or more permanent magnets 40. Once the permanent magnets 40 are disposed within the openings 22 there typically remains adjacent to either end of the permanent magnets 40 an opening, or remaining opening, 24. For illustrative purposes only, the stator and/or stator windings are not shown that substantially surround the rotor component.

The plurality of rotor bars 14 are disposed in some of the plurality of openings 24 longitudinally through the stack of rotor laminations 20. In this embodiment two adjacent rotor bars 14 are co-located in a single opening 24 while the opening 24 at the other end of the magnet 40 is left unfilled. At or near either end of the stack of rotor laminations 20 are connection elements 16 that are connected to both ends of the rotor bars 14. In this manner, the component 10 embodiment in FIG. 4B has four rotor loops 12 each constructed of two rotor bars 14 and two connection elements 16, thereby matching the quantity of poles (i.e., four) for the particular machine 100. By co-locating the two rotor bars 14 from adjacent poles, the four loops 12 are effectively connected to each other, thereby forming shifted rings 13.

Figure 5A:
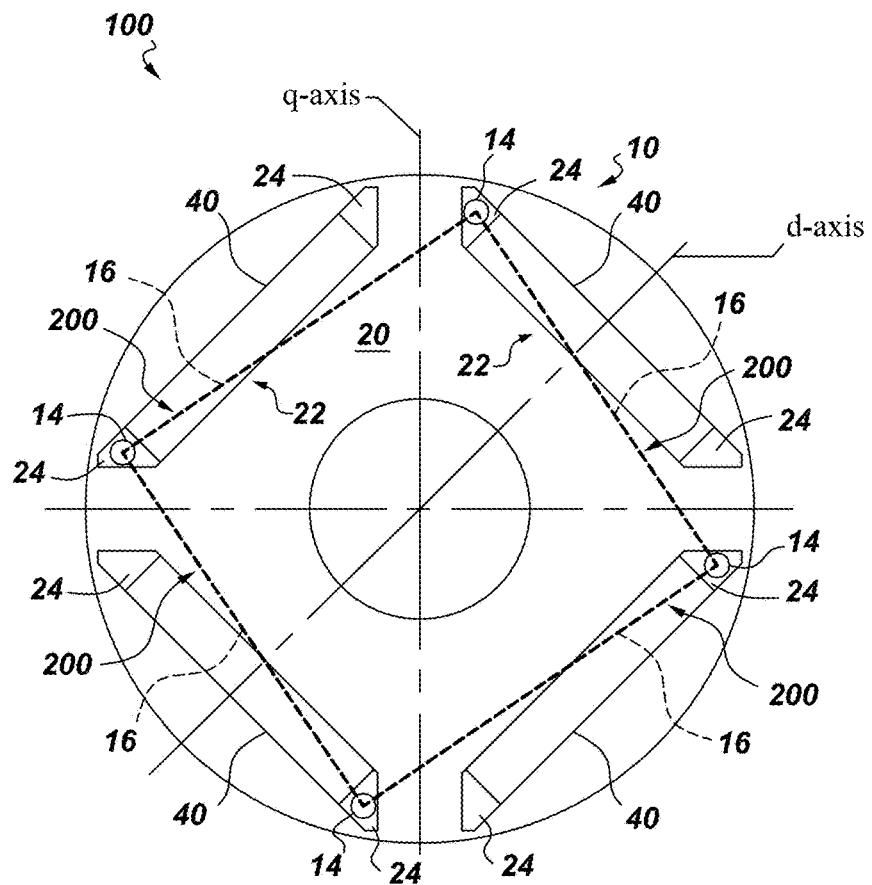
FIG. 5A is a top view of a portion of a rotor lamination and rotor circuit structure component according to another embodiment of the present invention.
Figure 5B:
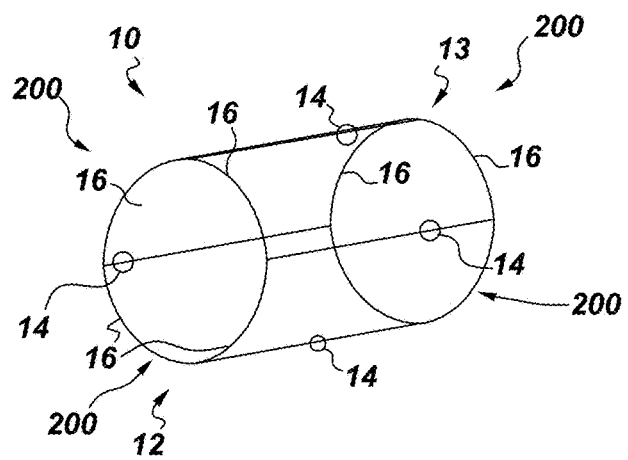
FIG. 5B is a schematic perspective diagram of the rotor circuit structure component in FIG. 5A according to an embodiment of the present invention.

Referring collectively to FIGS. 5A and 5B, a top view of a portion of a rotor lamination 20 portion of an electric machine 100 with a component 10 and a schematic diagram of a perspective view of the component 10 from FIG. 5A are shown respectively. FIG. 5A depicts a rotor lamination 20 of a single layer, four-pole IPM 100 having straight permanent magnets 40 therein. FIG. 5B depicts a rotor component 10 that may be termed a four-loop, shifted-cage configuration, similar to the embodiment shown in FIGS. 4A and 4B. As shown and known in the art, the rotor lamination 20 includes a plurality of openings 22 that, depending on the particular embodiment, may have disposed therein one or more permanent magnets 40. Once the permanent magnets 40 are disposed within the openings 22 there typically remains adjacent to either end of the permanent magnets 40 an opening, or remaining opening, 24. For illustrative purposes only, the stator and/or stator windings are not shown that substantially surround the rotor component.

The plurality of rotor bars 14 are disposed in some of the plurality of openings 24 longitudinally through the stack of rotor laminations 20. In this embodiment instead of co-locating two adjacent rotor bars 14 in a single opening 24 (as done in FIG. 4A), the two adjacent rotor bars 14 are combined into a single rotor bar 14. Again, the opening 24 at the other end of the magnet 40 is left unfilled. At or near either end of the stack of rotor laminations 20 are connection elements 16 that are connected to both ends of the rotor bars 14. In this manner, the component 10 embodiment in FIG. 5B has four rotor loops 12 each constructed of two rotor bars 14 and two connection elements 16, thereby matching the quantity of poles (i.e., four) for the particular machine 100. However, the quantity of total rotor bars 14 is less due to the effective sharing of rotor bars 14 from the adjacent loops 12 (and poles). The component 10 has eight connection elements 16 but four rotor bars 14 for use in a four pole machine 100. By cross connecting adjacent loops 12 with the connection elements 16 from adjacent poles, the four loops 12 are effectively connected to each other, thereby forming a cage, or shifted cage 13.

Figure 6A:
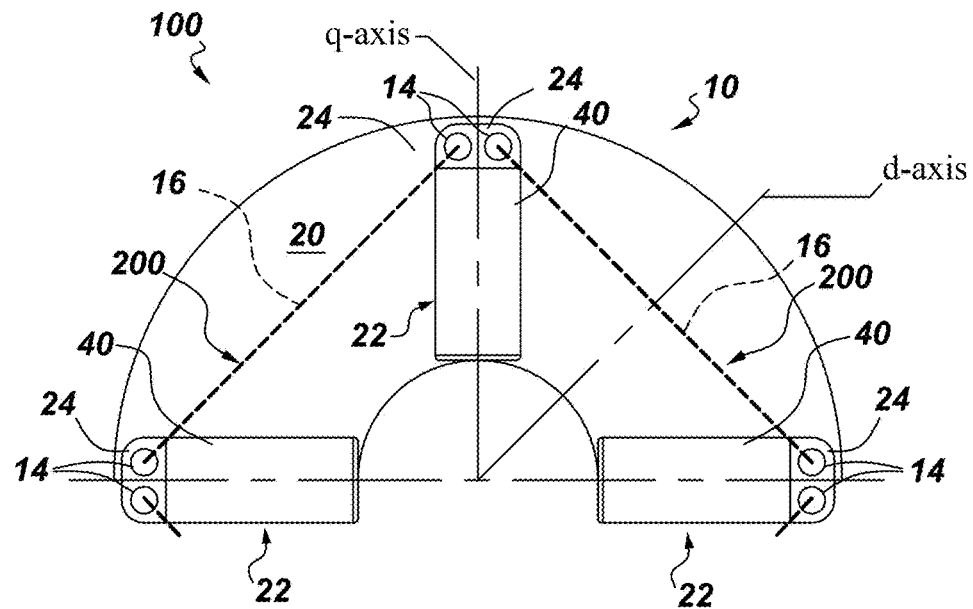
FIG. 6A is a top view of a portion of a rotor lamination and rotor circuit structure component according to another embodiment of the present invention.
Figure 6B:
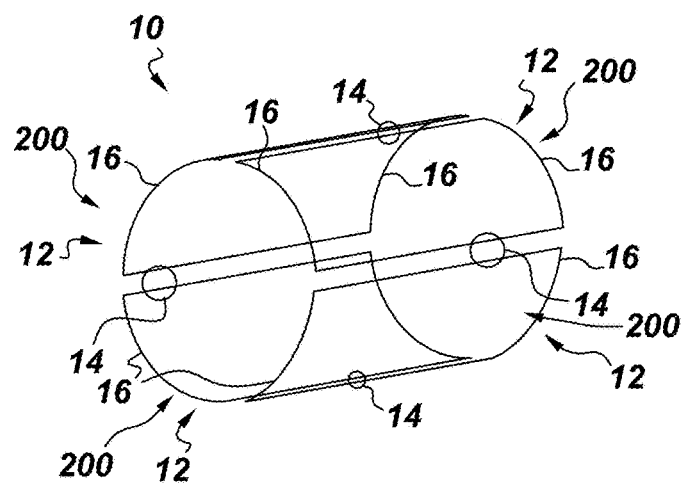
FIG. 6B is a schematic perspective diagram of the rotor circuit structure component in FIG. 6A according to an embodiment of the present invention.

Referring collectively to FIGS. 6A and 6B, a top view of a portion of a rotor lamination 20 portion of an electric machine 100 with a component 10 and a schematic diagram of a perspective view of the component 10 from FIG. 6A are shown respectively. FIG. 6A depicts a rotor lamination 20 of a spoke-type, four-pole IPM 100 having straight permanent magnets 40 therein. FIG. 6B depicts a rotor component 10 that may be termed a four-loop configuration. As shown and known in the art, the rotor lamination 20 includes a plurality of openings 22 that, depending on the particular embodiment, may have disposed therein one or more permanent magnets 40. Once the permanent magnets 40 are disposed within the openings 22 there typically remains adjacent to either end of the permanent magnets 40 an opening, or remaining opening, 24. For illustrative purposes only, the stator and/or stator windings are not shown that substantially surround the rotor component.

The plurality of rotor bars 14 are disposed in the plurality of outboard openings 24 longitudinally through the stack of rotor laminations 20. At or near either end of the stack of rotor laminations 20 are connection elements 16 that are connected to both ends of the rotor bars 14. In this manner, the component 10 embodiment in FIG. 6B has four rotor loops 12 each constructed of two rotor bars 14 and two connection elements 16, thereby matching the quantity of poles (i.e., four) for the particular machine 100.

Figure 7A:
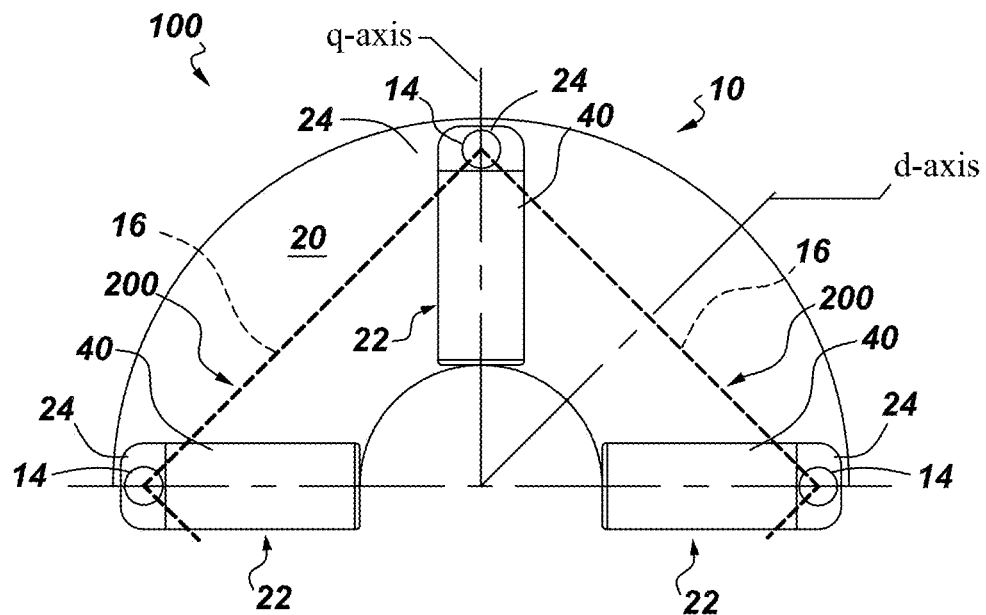
FIG. 7A is a top view of a portion of a rotor lamination and rotor circuit structure component according to another embodiment of the present invention.
Figure 7B:
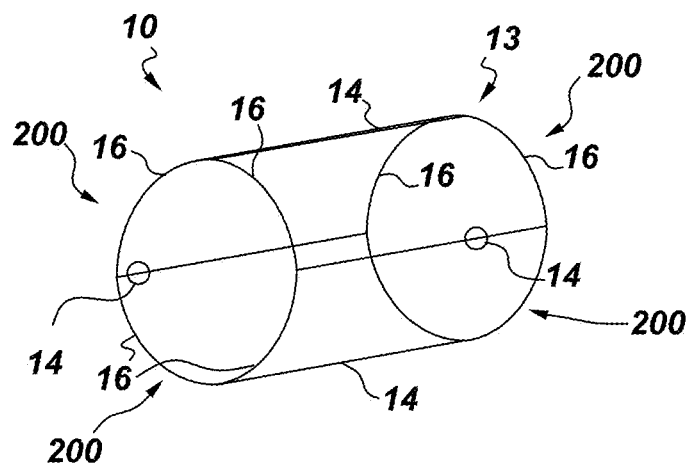
FIG. 7B is a schematic perspective diagram of the rotor circuit structure component in FIG. 7A according to an embodiment of the present invention.

Referring collectively to FIGS. 7A and 7B, a top view of a portion of a rotor lamination 20 portion of an electric machine 100 with a component 10 and a schematic diagram of a perspective view of the component 10 from FIG. 7A are shown respectively. FIG. 7A depicts a rotor lamination 20 of a spoke-type, four-pole IPM 100 having straight permanent magnets 40 therein. FIG. 7B depicts a rotor component 10 that may be termed a four-loop, rotor cage configuration, similar in aspects to the embodiment shown in FIGS. 6A and 6B. As shown and known in the art, the rotor lamination 20 includes a plurality of openings 22 that, depending on the particular embodiment, may have disposed therein one or more permanent magnets 40. Once the permanent magnets 40 are disposed within the openings 22 there typically remains adjacent to either end of the permanent magnets 40 an opening, or remaining opening, 24. For illustrative purposes only, the stator and/or stator windings are not shown that substantially surround the rotor component.

The plurality of rotor bars 14 are disposed in the outboard plurality of openings 24 longitudinally through the stack of rotor laminations 20. In this embodiment instead of co-locating two adjacent rotor bars 14 in a single opening 24 (as done in FIG. 6A), the two adjacent rotor bars 14 are combined into a single rotor bar 14. At or near either end of the stack of rotor laminations 20 are connection elements 16 that are connected to both ends of the rotor bars 14. In this manner, the component 10 embodiment in FIG. 7B has four rotor loops 12 each constructed of two rotor bars 14 and two connection elements 16, thereby matching the quantity of poles (i.e., four) for the particular machine 100. However, the quantity of total rotor bars 14 is less due to the effective sharing of rotor bars 14 from the adjacent loops 12 (and poles). The component 10 thus comprises eight connection elements 16 but four rotor bars 14 total for use in a four pole machine 100. By cross connecting adjacent loops 12 with the connection elements 16 from adjacent poles, the four loops 12 are effectively connected to each other, thereby forming a cage 13.

Figure 8A:
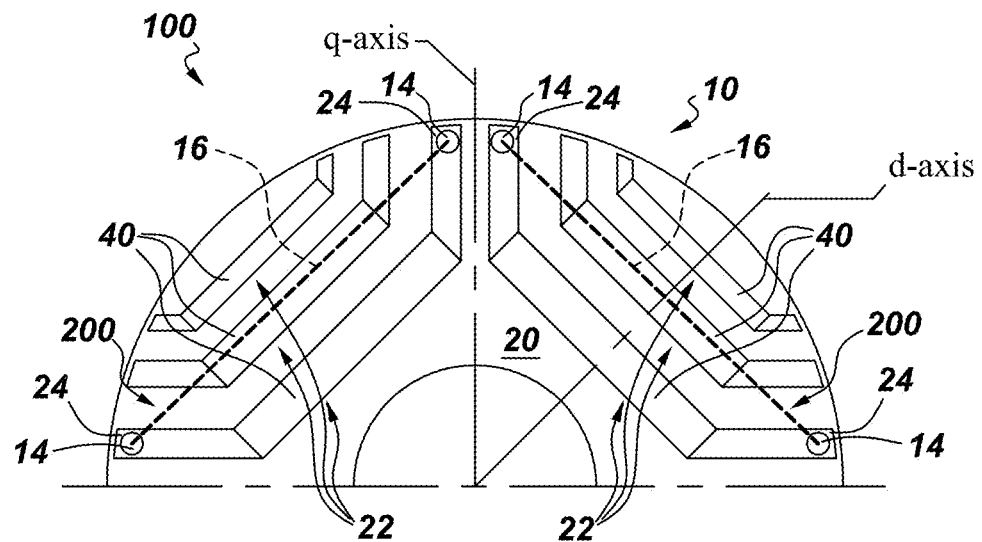
FIG. 8A is a top view of a portion of a rotor lamination and rotor circuit structure component according to another embodiment of the present invention.
Figure 8B:
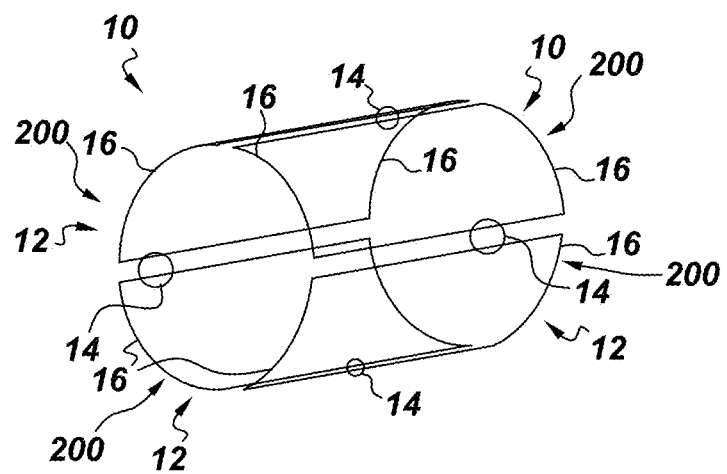
FIG. 8B is a schematic perspective diagram of the rotor circuit structure component in FIG. 8A according to an embodiment of the present invention.

Referring collectively to FIGS. 8A and 8B, a top view of a portion of a rotor lamination 20 portion of an electric machine 100 with a component 10 and a schematic diagram of a perspective view of the component 10 from FIG. 8A are shown respectively. FIG. 8A depicts a rotor lamination 20 of a multi-layer, four-pole IPM 100 having straight permanent magnets 40 therein. FIG. 8B depicts a rotor component 10 that may be termed a four-loop configuration. As shown and known in the art, the rotor lamination 20 includes a plurality of openings 22 that, depending on the particular embodiment, may have disposed therein one or more permanent magnets 40. Once the permanent magnets 40 are disposed within the openings 22 there typically remains adjacent to either end of the permanent magnets 40 an opening, or remaining opening, 24. For illustrative purposes only, the stator and/or stator windings are not shown that substantially surround the rotor component. As with multi-layer IPM, there is typically a plurality of rows of openings 22 and permanent magnets 40 therein located for each pole.

The plurality of rotor bars 14 are disposed in the plurality of openings 24 longitudinally through the stack of rotor laminations 20. At or near either end of the stack of rotor laminations 20 are connection elements 16 that are connected to both ends of the rotor bars 14. In this manner, the component 10 embodiment in FIG. 8B has four rotor loops 12 each constructed of two rotor bars 14 and two connection elements 16, thereby matching the quantity of poles (i.e., four) for the particular machine 100. In this particular embodiment, the rotor bars 14 are located in the furthest inboard openings 24 of the multi-layer rotor lamination 20. It should be apparent, that the rotor bars could be located in other openings 24 of the lamination 20.

Figure 9A:
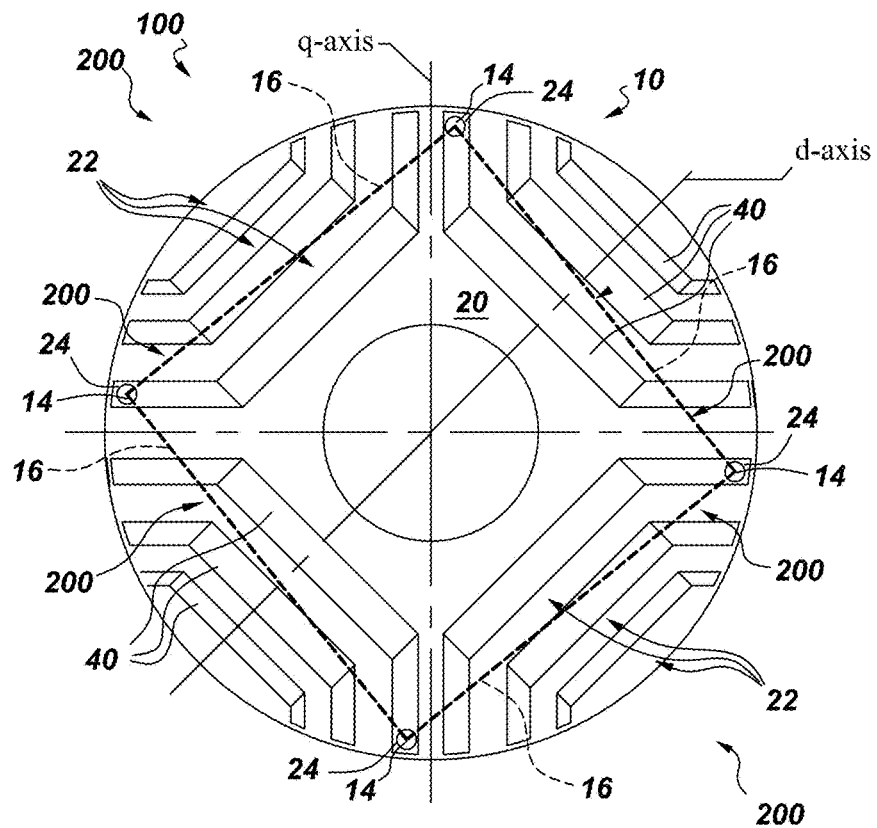
FIG. 9A is a top view of a portion of a rotor lamination and rotor circuit structure component according to another embodiment of the present invention.
Figure 9B:
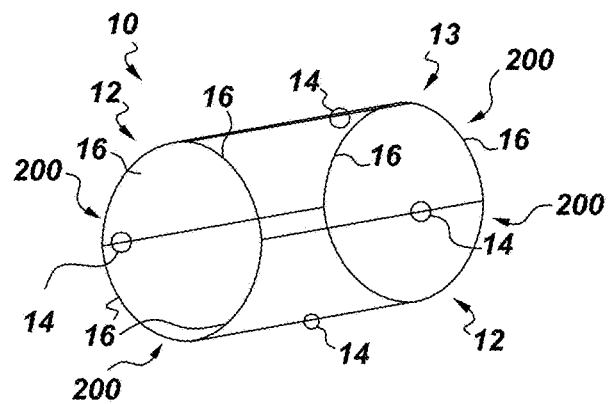
FIG. 9B is a schematic perspective diagram of the rotor circuit structure component in FIG. 9A according to an embodiment of the present invention.

Referring collectively to FIGS. 9A and 9B, a top view of (an entire) portion of a rotor lamination 20 portion of an electric machine 100 with a component 10 and a schematic diagram of a perspective view of the component 10 from FIG. 9A are shown respectively. FIG. 9A depicts a rotor lamination 20 of a multi-layer, four-pole IPM 100 having straight permanent magnets 40 therein. FIG. 9B depicts a rotor component 10 that may be termed a four-loop, cage or shifted-cage configuration. As shown and known in the art, the rotor lamination 20 includes a plurality of openings 22 that, depending on the particular embodiment, may have disposed therein one or more permanent magnets 40. Once the permanent magnets 40 are disposed within the openings 22 there typically remains adjacent to either end of the permanent magnets 40 an opening, or remaining opening, 24. For illustrative purposes only, the stator and/or stator windings are not shown that substantially surround the rotor component. As with multi-layer IPM, there is typically a plurality of rows of openings 22 and permanent magnets 40 therein located for each pole.

The plurality of rotor bars 14 are disposed in the plurality of openings 24 longitudinally through the stack of rotor laminations 20. In this configuration only a single rotor bar 14 is placed in an opening 24 in each pole (See FIG. 9A). At or near either end of the stack of rotor laminations 20 are connection elements 16 that are connected to both ends of the rotor bars 14. The connection element 16 connects a rotor bar 14 from a first pole to the rotor bar 14 of an adjacent pole, thereby shifting the element 10. In this manner, the component 10 embodiment in FIG. 9B has four rotor loops 12 each constructed of two rotor bars 14 and two connection elements 16, thereby matching the quantity of poles (i.e., four) for the particular machine 100. However, due to the shifted-cage configuration of the embodiment, only four rotor bars 14 total and eight connection elements 16 are required for a four-pole machine 100 such as that depicted. In this particular embodiment, the rotor bars 14 are located in the furthest inboard openings 24 of the multi-layer rotor lamination 20. It should be apparent, that the rotor bars could be located in other openings 24 of the lamination 20.

Figure 10A:
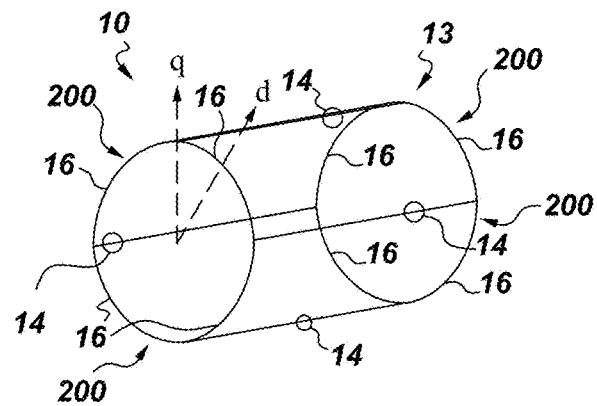
FIGS. 10A, 10B, and 10C are schematic diagrams showing perspective views of a rotor circuit structure component according to embodiments of the present invention.
Figure 10B:
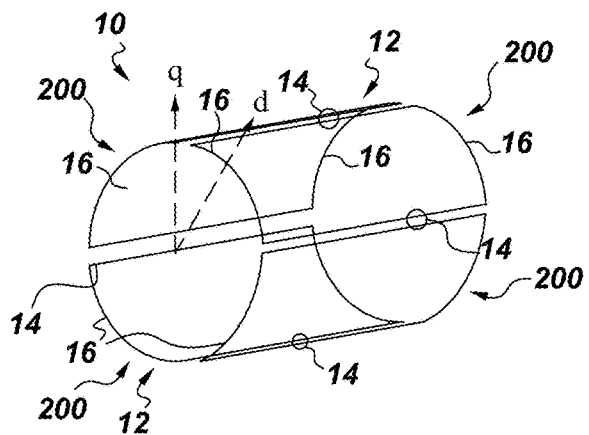
Figure 10C:
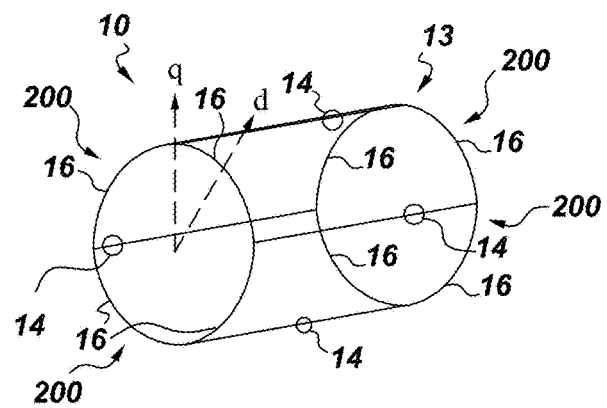

Referring collectively to FIGS. 10A, 10B, and 10C, schematic diagrams of perspective views of components 10 according to aspects of the present invention are shown. The figures are provided to show various schematic embodiments to show the general positional relationship between various elements of the component 10 and a d-axis and q-axis of a machine (not) that may employ the component 10. The d-axis (direct axis) and the q-axis (quadrature axis) are denoted by arrows labeled "d" and "q", respectively. As shown in FIG. 10A, a component 10 includes four rotor loops or rings 12. Each ring 12 comprises two rotor bars 14 connected at each end to a connector element 16. Rotor bars 14 are effectively shared by adjacent rings 12 so that all four rings 12 are connected. There are a total of four rotor bars 14 for the element 10. Because the rotor bars 14 are effectively shared by adjacent poles or the component 10, only four rotor bars 14 are needed by the component 10 for use with a four-pole machine (not shown). In this manner, the four loops 12, being interconnected, effectively define a cage 13. As shown, the approximate midpoint of the loop 12 aligns with the d-axis. In other words, a loop 12 is substantially concentric with the d-axis. Similarly, the q-axis may substantially align with a rotor bar 14.

As shown in FIG. 10B, the four rings 12 are not interconnected as in the embodiment shown in FIG. 10A. Each ring 12 comprises two rotor bars 14 and two connector elements 16. As shown, and as with the embodiment in FIG. 10A, the approximate midpoint of the loop 12 aligns with the d-axis. In other words, a loop 12 is substantially concentric with the d-axis. Similarly, the q-axis may substantially align with a conceptual line or axis between two adjacent rotor bars 14.

Referring to the embodiment shown in FIG. 10C, the element 10 comprises four rotor loops or rings 12. Each ring 12 comprises two rotor bars 14 connected at each end to a connector element 16. Rotor bars 14 are effectively shared by adjacent rings 12 so that all four rings 12 are connected, effectively defining a shifted cage 13 configuration. Thus, there are a total of four rotor bars 14 for the element 10. As shown, and as with the embodiments in FIGS. 10A and 10B, the approximate midpoint of the loop 12 aligns with the d-axis. In other words, a loop 12 is substantially concentric with the d-axis. However, in the embodiment shown in FIG. 10C, the rotor bar 14 does not align with the q-axis but is shifted by a certain angle (or distance) from the q-axis.

As shown in FIGS. 10A-10C, each embodiment is configured such that the d-axis aligns about with the midpoint of connector element 16. That is a loop 12 or plurality of inner loops may be substantially concentric with the d-axis. However, depending on the embodiment the rotor bar 14 or an equidistant axis between adjacent rotor bars 14 may align with the q-axis a shown in FIGS. 10A and 10B, respectively. Contrastingly, as shown for example in FIG. 10C, the rotor bar 14 or an equidistant axis between adjacent rotor bars 14 may be offset, or shifted, from being aligned with the q-axis. The embodiments shown are configured for use in a four-pole machine 100. It should be apparent to one skilled in the art that other configurations of elements 10 are allowed without departing from aspects of the present invention. For example, an element 10 configured for use in an eight-pole machine 100 would contrastingly have at least eight rotor bars 14. In embodiments of the present invention, the quantity of rotor bars 14 would equal the quantity of poles of the machine 100 (see e.g., FIGS. 10A and 10C). Contrastingly, in other embodiments, such as the element 10 shown in FIG. 10B, the quantity of rotor bars 14 (e.g., eight) may be double the quantity of poles (e.g., four) of the machine 100. Clearly, other configurations of elements 10 that have differing quantities of rotor bars 14 in view of quantity of poles of the machine 100 in which the element 10 is configured for are available under aspects of the present invention without departing from the intent of the invention.

Figure 11:
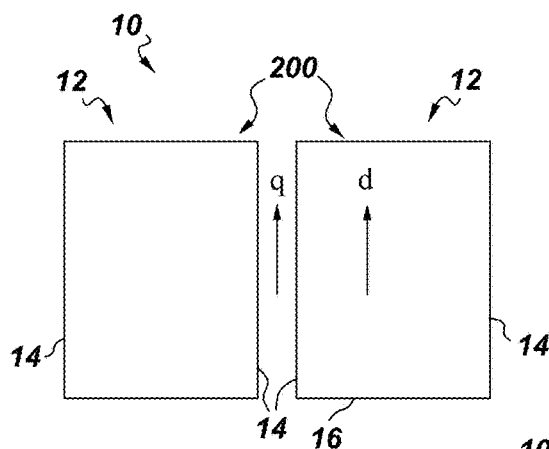
FIG. 11 is a schematic diagram of a top view of a portion of a rotor circuit structure component according to an embodiment of the present invention.
Figure 12A:
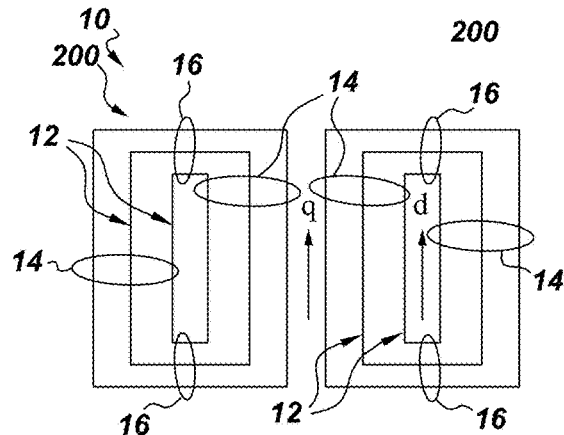
FIG. 12A is a schematic diagram of a top view of a portion of a rotor circuit structure component according to an embodiment of the present invention.

Referring to FIGS. 11 and 12A, schematic diagrams of top views of a portion of a rotor structure component 10 according to embodiments of the present invention are shown. (These schematic views are such that effectively it is as if the component 10 were opened and rolled out flat, in a planar fashion, on the plane of the page). The component 10 comprises a plurality of rotor bars 14 connected to a plurality of connection elements 16. The component 10 in FIG. 11 comprises a single ring 12 per pole of the machine 100 (not shown). The two adjacent rotor bars 14 align with the q-axis and the approximate midpoint of the ring 12 aligns with the d-axis. That is the ring 12 on the right side in the FIG. 11 is substantially concentric with the d-axis. Alternatively, the component 10 of FIG. 12A comprise multiple rings 12 per pole of the machine 100 (not shown). Multiple rings 12 can further assist in further increasing saliency. There are three rings 12 per pole on the component 10 shown. The outermost two adjacent rotor bars 14 of the rings 12 align with the q-axis and the approximate midpoints of the multiple rings 12 align with the d-axis. That is the rings 12 on the right side in the FIG. 12A are substantially concentric with the d-axis. It should be apparent that although three rings 12 are depicted, other configurations and quantities are allowable without departing from aspects of the present invention.

Figure 12B:
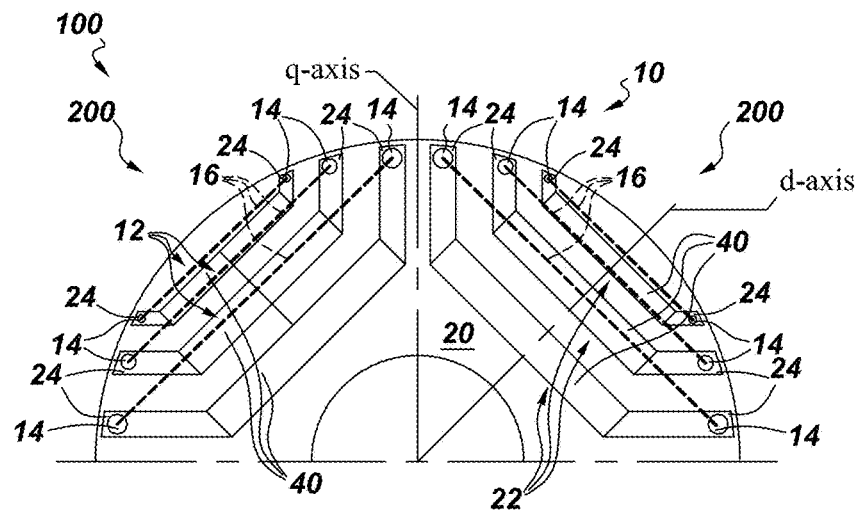
FIG. 12B is top view of a portion of a rotor lamination and the rotor circuit structure component of FIG. 12A according to another embodiment of the present invention.

Referring to FIG. 12B, a top view of a portion of a rotor lamination 20 portion of an electric machine 100 with a component 10 and a schematic diagram of a perspective view of the component 10 from FIG. 12A is shown. FIG. 12B depicts a rotor lamination 20 of a multi-layer, four-pole IPM 100 having straight permanent magnets 40 therein. Some attributes of the embodiment shown are similar to the embodiment shown in FIG. 8A. As shown and known in the art, the rotor lamination 20 includes a plurality of openings 22 that, depending on the particular embodiment, may have disposed therein one or more permanent magnets 40. Once the permanent magnets 40 are disposed within the openings 22 there typically remains adjacent to either end of the permanent magnets 40 an opening, or remaining opening, 24. For illustrative purposes only, the stator and/or stator windings are not shown that substantially surround the rotor component. As with multi-layer IPM, there is typically a plurality of rows of openings 22 and permanent magnets 40 therein located for each pole.

The plurality of rotor bars 14 are disposed in the plurality of openings 24 longitudinally through the stack of rotor laminations 20. At or near either end of the stack of rotor laminations 20 are connection elements 16 that are connected to both ends of the rotor bars 14. In this manner, the component 10 embodiment in FIG. 12B has four rotor loops 12 each constructed of two rotor bars 14 and two connection elements 16, thereby matching the quantity of poles (i.e., four) for the particular machine 100. However, there are two inner rings or loops 12 for each ring or loop 12 (See FIG. 12A). As shown, the rotor bars 14 for each of the two inner rings or loops 12 also are inserted into the openings 24 adjacent to magnets 40.

Figure 13:
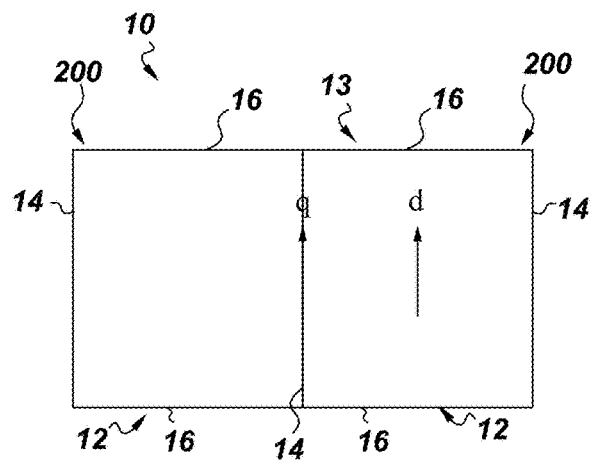
FIG. 13 is a schematic diagram of a top view of a portion of a rotor circuit structure component according to an embodiment of the present invention.
Figure 14A:
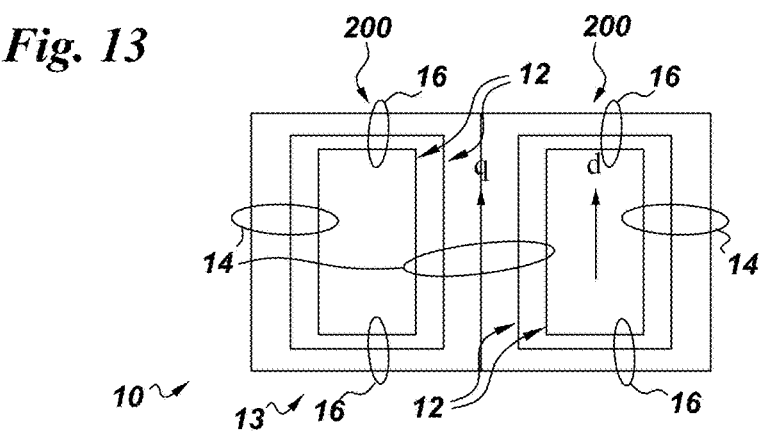
FIG. 14A is a schematic diagram of a top view of a portion of a rotor circuit structure component according to an embodiment of the present invention.

Referring to FIGS. 13 and 14A, schematic diagrams of top views of a portion of a rotor structure component 10 according to embodiments of the present invention are shown. (These schematic views are such that effectively it is as if the component 10 were opened and rolled out flat, in a planar fashion, on the plane of the page). The component 10 comprises a plurality of rotor bars 14 connected to a plurality of connection elements 16. The rotor bars 14 are shared by adjacent loops or rings 12. As such the rings 12 collectively form a cage 13. The component 10 in FIG. 13 comprises a cage 13 with a single loop 12 per pole of the machine 100 (not shown). The single, shared rotor bar 14 aligns with the q-axis and the approximate midpoint of the loops 12 of the cage 13 aligns with the d-axis. That is the ring 12 of the cage 13 on the right side in the FIG. 13 is substantially concentric with the d-axis. Alternatively, the component 10 of FIG. 14A comprise a cage 13 also having multiple inner rings 12 per pole of the machine 100 (not shown). The additional multiple rings 12 can further assist in further increasing saliency. There are two inner rings 12 per pole on the component 10 in addition to the cage 13. The shared rotor bar 14 of the cage 13 aligns with the q-axis and the approximate midpoints of the multiple inner rings 12 and the cage 13 align with the d-axis. That is the rings 12 and the cage 13 on the right side in the FIG. 14A is substantially concentric with the d-axis. It should be apparent that although two rings 12 are depicted in addition to the cage 13, other configurations and quantities are allowable without departing from aspects of the present invention.

Figure 14B:
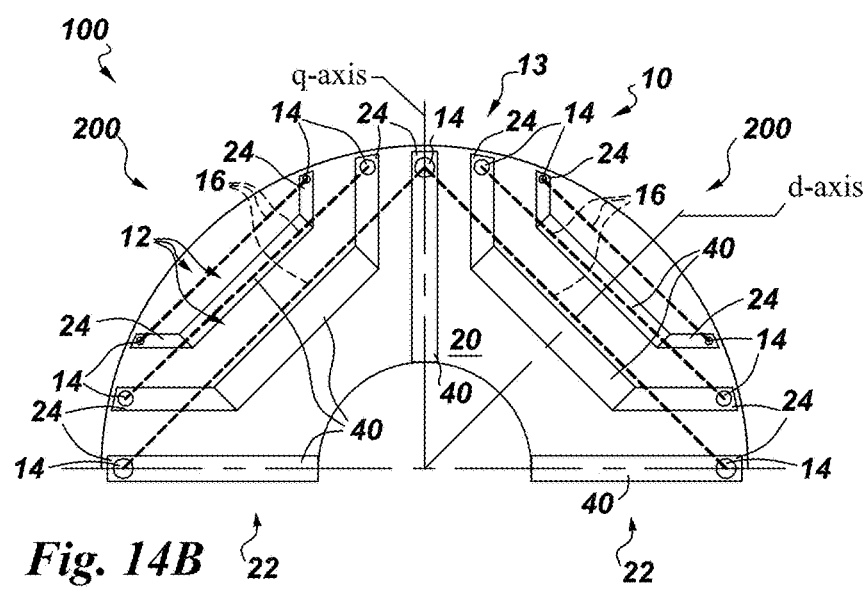
FIG. 14B is top view of a portion of a rotor lamination and the rotor circuit structure component of FIG. 14A according to another embodiment of the present invention.

Referring to FIG. 14B, a top view of a portion of a rotor lamination 20 portion of an electric machine 100 with a component 10 and a schematic diagram of a perspective view of the component 10 from FIG. 14A is shown. FIG. 14B depicts a rotor lamination 20 of a combination multi-layer/spoke-type, four-pole IPM 100 having straight permanent magnets 40 therein. Some attributes of the embodiment shown are similar to the embodiments shown in both FIG. 7A and FIG. 8A. As shown and known in the art, the rotor lamination 20 includes a plurality of openings 22 that, depending on the particular embodiment, may have disposed therein one or more permanent magnets 40. Once the permanent magnets 40 are disposed within the openings 22 there typically remains adjacent to either end of the permanent magnets 40 an opening, or remaining opening, 24. For illustrative purposes only, the stator and/or stator windings are not shown that substantially surround the rotor component. As with multi-layer IPM, there is typically a plurality of rows of openings 22 and permanent magnets 40 therein located for each pole. As shown, the spoke-type aspect of the IPM 100 also includes magnets 40 that are radially disposed in a plurality of openings 22. Once the permanent magnets 40 are disposed within the openings 22 there typically remains adjacent to either end of the permanent magnets 40 an opening 24.

The plurality of rotor bars 14 are disposed in the plurality of openings 24 longitudinally through the stack of rotor laminations 20. At or near either end of the stack of rotor laminations 20 are connection elements 16 that are connected to both ends of the rotor bars 14. As shown in FIG. 14A, the outer rings 12 share common rotor bars 14, thereby defining a cage 13. In this manner, the component 10 embodiment in FIG. 14B has four rotor loops 12 each constructed of two rotor bars 14 and two connection elements 16, thereby matching the quantity of poles (i.e., four) for the particular machine 100. The four rotor loops 12 sharing common rotor bars 14 thereby defines a cage 13. Thus, the cage 13 may be formed of four rotor bars 14 and eight total connector elements 16. However, there are also two inner rings or loops 12 for each outer ring or loop 12 (See FIG. 14A). As shown, the rotor bars 14 for each of the two inner rings or loops 12 also are inserted into the openings 24 adjacent to magnets 40. The rotor bars 14 for the cage 13 may be inserted in the openings 24 adjacent to the spoke-type magnets 40. The rotor bars 14 for the two inner loops or rings 12 may be inserted in the openings 24 adjacent to the multi-layer type magnets 40.

Figure 15:
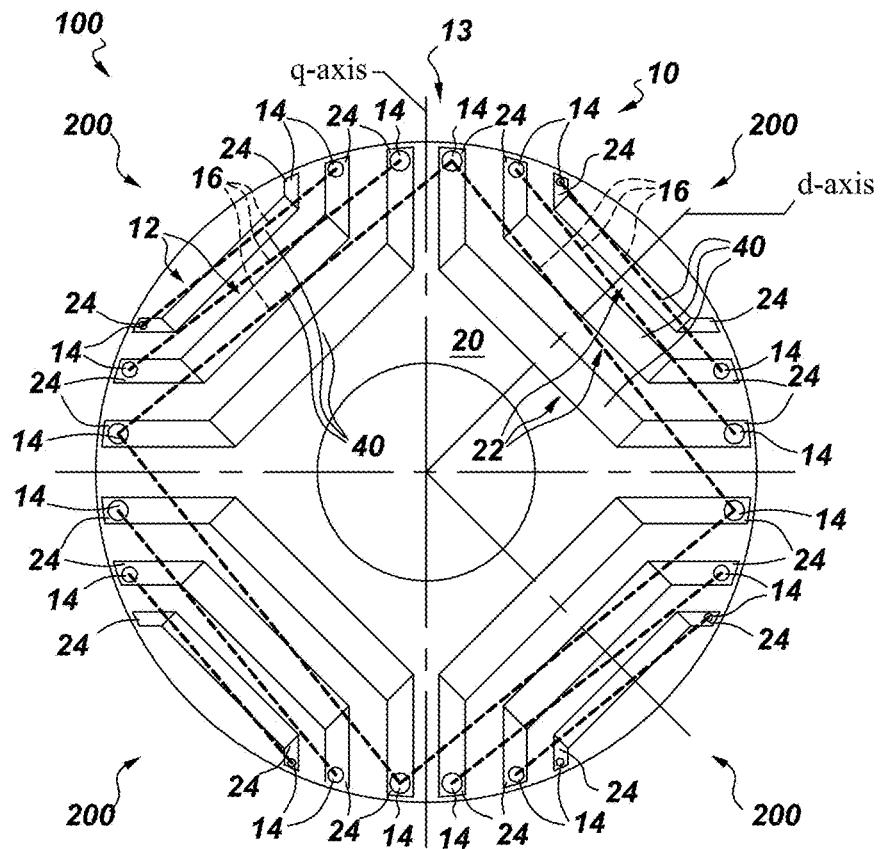
FIG. 15 is top view of a portion of a rotor lamination and the rotor circuit structure component according to another embodiment of the present invention.

Referring to FIG. 15, a top view of (an entire) portion of a rotor lamination 20 portion of an electric machine 100 with a component 10 is shown. FIG. 15 depicts a rotor lamination 20 of a multi-layer, four-pole IPM 100 having straight permanent magnets 40 therein. This embodiment is similar in some aspects to the embodiments illustrated in FIGS. 9A and 9B and the FIGS. 14A and 14B. The rotor component 10 may be termed a shifted-cage with inner rings or loops configuration. As shown and known in the art, the rotor lamination 20 includes a plurality of openings 22 that, depending on the particular embodiment, may have disposed therein one or more permanent magnets 40. Once the permanent magnets 40 are disposed within the openings 22 there typically remains adjacent to either end of the permanent magnets 40 an opening, or remaining opening, 24. For illustrative purposes only, the stator and/or stator windings are not shown that substantially surround the rotor component. As with multi-layer IPM, there is typically a plurality of rows of openings 22 and permanent magnets 40 therein located for each pole.

The plurality of rotor bars 14 are disposed in the plurality of openings 24 longitudinally through the stack of rotor laminations 20. In this configuration only a single rotor bar 14 is placed in an opening 24 in each pole (See FIG. 9A). At or near either end of the stack of rotor laminations 20 are connection elements 16 that are connected to both ends of the rotor bars 14. The connection element 16 connects a rotor bar 14 from a first pole to the rotor bar 14 of an adjacent pole, thereby shifting the element 10 creating a shifted cage 13 configuration. In this manner, the component 10 embodiment has four rotor loops 12 each constructed of two rotor bars 14 and two connection elements 16, thereby matching the quantity of poles (i.e., four) for the particular machine 100. However, due to the shifted-cage configuration of the embodiment, only four rotor bars 14 total and eight connection elements 16 are required for a four-pole machine 100 such as that depicted. In this particular embodiment, the rotor bars 14 are located in the furthest inboard openings 24 of the multi-layer rotor lamination 20. It should be apparent, that the rotor bars could be located in other openings 24 of the lamination 20. In addition, there are two additional inner loops 12 for each pole that are shifted in their configuration as well.

Figure 16:
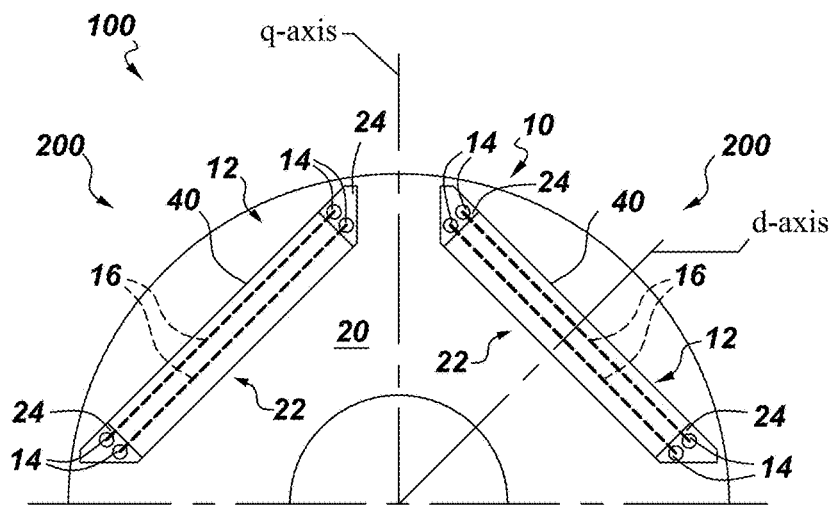
FIG. 16 is top view of a portion of a rotor lamination and the rotor circuit structure component according to another embodiment of the present invention.

Referring to FIG. 16, a top view of a portion of a rotor lamination 20 portion of an electric machine 100 with a component 10 is shown. FIG. 16 depicts a rotor lamination 20 of a single layer, four-pole IPM 100 having straight permanent magnets 40 therein. (The embodiment is similar in aspects to the embodiment shown in FIGS. 3A and 3B). As shown and known in the art, the rotor lamination 20 includes a plurality of stator windings (not shown) and inboard of the stator windings are disposed one or more permanent magnets 40 located in one or more openings 22 in the rotor lamination 20. Once the permanent magnets 40 are disposed within the openings 22 there typically remains adjacent to either end of the permanent magnets 40 an opening 24.

The plurality of rotor bars 14 are disposed in the plurality of openings 24 longitudinally through the stack of rotor laminations 20. At or near either end of the stack of rotor laminations 20 are connection elements 16 that are connected to both ends of the rotor bars 14. In this embodiment, one or more ring 12 (i.e., rotor bars 14 and connection elements 16) is split into two or more rings 12. As shown, there are two rotor bars 14 placed in the openings 24, and there are two connection elements 16 connecting the two rotor bars 14. In this manner, the component 10 embodiment in FIG. 16 has four rotor loops 12 where each loop 12 is constructed of four rotor bars 14 and four connection elements 16 for the particular machine 100. By splitting the loops into multiple loops (term "split rotor bar" configuration) fault tolerance is provided. As long as at least one loop in the plurality of loops remains functional, the ring 12 will be able to introduce the desired ring saliency. It should be apparent that under aspects of the present invention that various configurations of splitting, via design, a connection element 16, rotor bar 14, loop 12, and/or cage 13 into two or more elements other than that shown is possible. For example, the elements may be in other quantities than just two (as depicted in FIG. 16).

Figures 17A, 18:
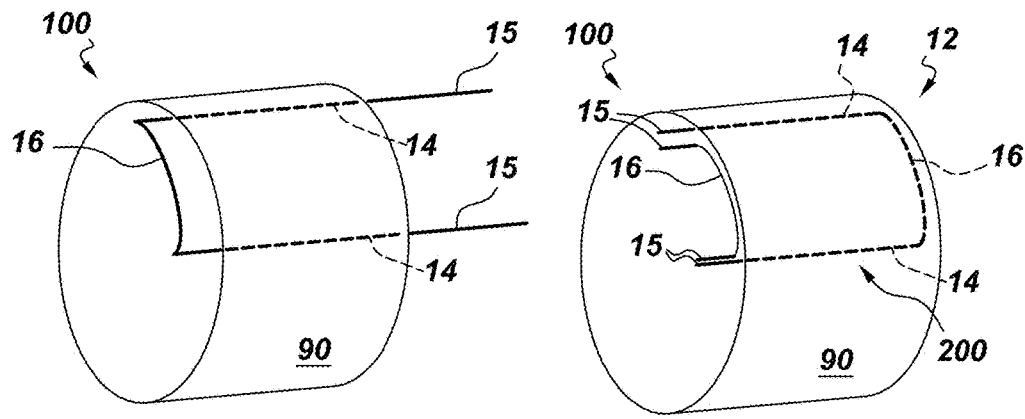
FIG. 17A is schematic diagram showing a perspective view of a partial installation of a portion of a rotor circuit structure component in a rotor portion of a machine according to an embodiment of the present invention.
FIG. 18 is schematic diagram showing a perspective view of a completed installation of a portion of a rotor circuit structure component in a rotor portion of a machine according to another embodiment of the present invention.
Figures 17B, 19:
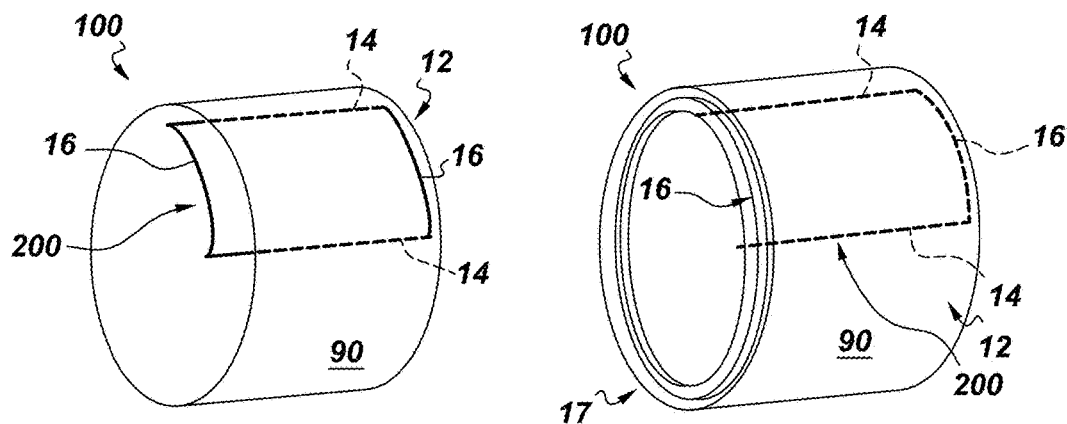
FIG. 17B is schematic diagram showing a perspective view of a completed installation embodiment shown in FIG. 17A.
FIG. 19 is schematic diagram showing a perspective view of a completed installation of a portion of a rotor circuit structure component in a rotor portion of a machine according to another embodiment of the present invention.

Referring collectively to FIGS. 17A, 17B, 17, and 18, schematic diagrams of perspective views of various embodiments showing the installation of a portion of a component 10 in a machine 100 in accordance with aspects of the present invention. While FIG. 17A shows a partial installation of an element, while FIG. 17B shows the completed installation of the element from FIG. 17A. A U-shaped element, which may be pre-formed (e.g., bent), is made of a conductive, non-magnetic material comprising two rotor bars 12 connected via a connection element 16. The U-shaped element may be inserted into two openings (e.g., 24) in the rotor 90 of the machine 100 (not fully shown). As shown, each of the rotor bars 14 has extensions 15 that extend beyond the length of the rotor core 90 of the machine 100. The extensions 15 may then be bent and connected together to form a second connection element 16, thereby forming a completed ring 12, as shown in FIG. 17B. The extensions 15 may be connected by any known method including, but not limited to, brazing, welding, mechanically fastening, and the like.

Referring to the embodiment shown in FIG. 18, a U-shaped element (similar to the embodiment discussed in FIG. 17A) comprising element, which may be pre-formed (e.g., bent), is made of a conductive, non-magnetic material comprising two rotor bars 12 connected via a connection element 16. The U-shaped element may be inserted into two openings (e.g., 24) in the rotor 90 of the machine 100 (not entirely shown). As shown, each of the rotor bars 14 has extensions 15 that extend beyond the length of the rotor 90 of the machine 100. In a typical embodiment, the extensions 15 of the embodiment in FIG. 18 do not need to be as long as the extensions 15 of the embodiment in FIG. 17A. A small U-shaped end piece 18, made of a conductive material, having extensions 15 may be placed so that the respective extensions 15 of the end piece 18 and the U-shaped element are adjacent to each other. The extensions 15 may be connected by suitable means (e.g., brazing, welding, mechanical fastening, etc.) thereby creating a loop 12. It should be noted that the end piece need not be U-shaped as discussed above. For example, in another embodiment, a straight element like connection element 16 without extensions 15 may be used in lieu of the U-shaped end piece 18, wherein the connection element 16 is attached to the U-shaped element and connected thereto.

Referring to the embodiment shown in FIG. 19, a U-shaped element (similar to the embodiment discussed in FIG. 18) comprising element, which may be pre-formed (e.g., bent), is made of a conductive, non-magnetic material comprising two rotor bars 12 connected via a connection element 16. The U-shaped element may be inserted into two openings (e.g., 24) in the rotor 90 of the machine 100. As shown, each of the rotor bars 14 has extensions 15 that extend beyond the length of the rotor 90 of the machine 100. In a typical embodiment, the extensions 15 of the embodiment in FIG. 19 do not need to be as long as the extensions 15 of the embodiment in FIG. 17A. A full-ring connector 17, made of conductive material, may be placed so that the extensions 15 of the U-shaped element are adjacent to and/or extending through the connector 17. The extensions 15 and/or rotor bars 14 may be connected to the connector 17 by suitable means (e.g., brazing, welding, mechanical fastening, etc.) thereby creating a loop 12.

Figure 20:
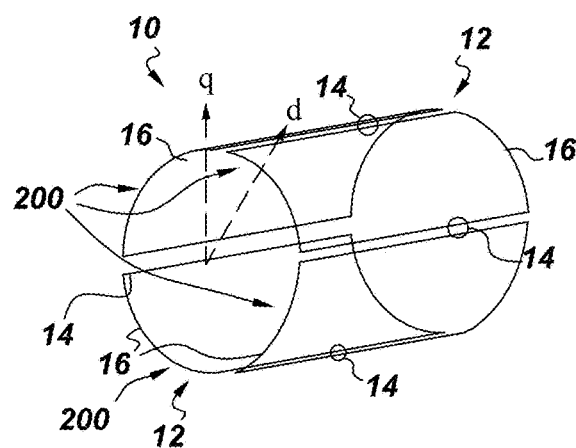
FIG. 20 is a schematic diagram showing a perspective view of a rotor circuit structure component according to another embodiment of the present invention.

Referring to FIG. 20, a schematic diagram of a perspective view of a component 10 according to an aspect of the present invention is shown. The d-axis (direct axis) and the q-axis (quadrature axis) are denoted by arrows labeled "d" and "q", respectively. As shown, the component 10 includes four rotor loops or rings 12. Each ring 12 comprises two rotor bars 14 connected at one end to a connector element 16. The other ends of the rotor bars 14 are connected to a single full ring connector 17. In this manner, all rings 12 are effectively connected to the full ring connector 17, thereby defining a cage 13. There are a total of eight rotor bars 14 for the element 10. In this manner, the four loops 12, being interconnected, effectively define a cage 13. As shown, the approximate midpoint of a loop 12 aligns with the d-axis. In other words, a loop 12 is substantially concentric with the d-axis. Similarly, the q-axis substantially aligns with a midpoint between two adjacent rotor bars 14.

While various embodiments discussed herein have general disclosed magnets 40 and openings 22 of specific sizes and configurations, it should be apparent that different quantities, shapes, and configurations that those illustrated may be used without departing from aspects of the present invention. For example, the openings 22 and/or magnets 40 may be other shapes other than straight including, for example, curved, trapezoidal, round, and the like, and combinations thereof.

While various embodiments discussed herein have general disclosed rotor conductors (e.g., rotor bars 14) disposed in openings 24 adjacent to magnets 40 in the rotor lamination 20, it should be apparent that under aspects of the present invention that the rotor conductors, in certain embodiments, are disposed in openings and/or voids (e.g., grooves, channels, gaps, etc.) on the outer portion 90 of the rotor. In other words, in embodiments the rotor conductors may be placed in a location such that, at least initially, is not fully surrounded by rotor lamination material.

Figure 26:
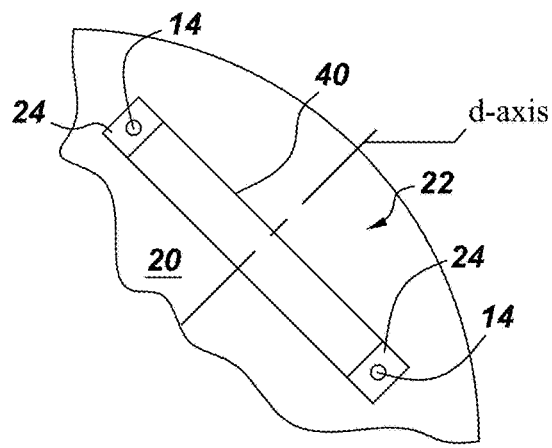
FIG. 26 is top view of a portion of a rotor lamination and the rotor circuit structure component according to another embodiment of the present invention.
Figure 27:
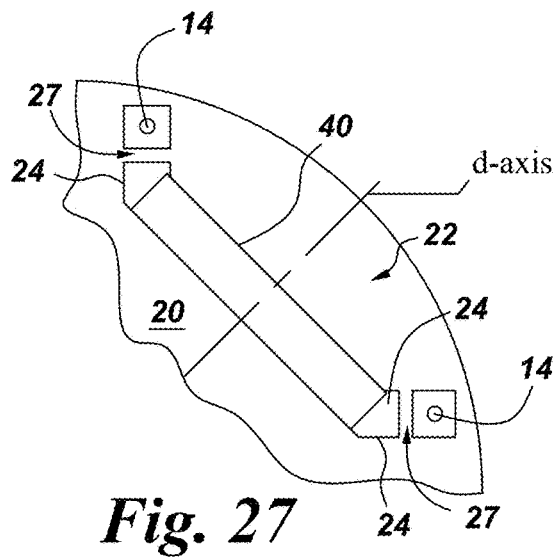
FIG. 27 is top view of a portion of a rotor lamination and the rotor circuit structure component according to another embodiment of the present invention.
Figure 28:
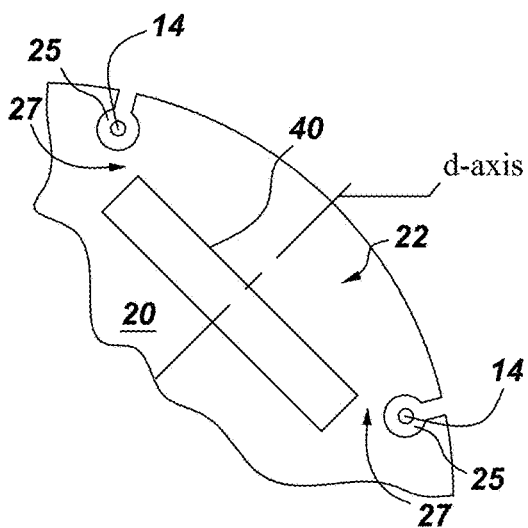
FIG. 28 is top view of a portion of a rotor lamination and the rotor circuit structure component according to another embodiment of the present invention.

Referring collectively to FIGS. 26-28, top views of portions of a rotor lamination and the rotor circuit structure component of exemplary embodiments are depicted.

As shown for example in FIG. 26, the rotor circuit may be collocated with some of the magnets of the rotor structure in the same opening. A shown the magnet(s) 40 are located in the opening 22 in the lamination 20. The rotor bars 14 which comprise part of the rotor circuit are in a portion 24 of the opening 22 adjacent and collocated with the magnet(s) 40.

Contrastingly, FIGS. 27 and 28 show embodiments wherein the rotor circuit and magnets are not collocated in the same lamination opening. As shown in FIGS. 27 and 28, a bridge of material 27 of the lamination 20 is located between openings through the lamination 20. For example, the bridge of material 27 is located between the rotor circuit (e.g., bar 14) and the opening 22 that houses the magnet(s) 40. In other embodiments, it should be clear that the bridge of materials 27 may be in greater quantities and/or different configurations than those depicted. Numerous bridges may be used to improve structural integrity of the lamination 20 in consideration of the quantity and type of openings 22 in the lamination. Depending on the configuration of the electrical machine, the various openings may house one or more magnet 40; one or more rotor circuit (e.g., bar 14); and/or be devoid of either rotor circuit and magnet 40.

The embodiment in FIG. 28 is distinguished from the embodiments depicted in FIGS. 26 and 27 as to the location of the rotor circuit and bars 14. The rotor bars 14 are installed in a second opening 25 that is disposed along the exterior of the rotor lamination core stack. This second opening 25 is at least partially exposed to the exterior of the rotor core (in contrast to the openings that the rotor bars 14 in FIGS. 26 and 27). The second opening 25 may be any suitable cross sectional shape including, but not limited to, a groove, a slot, or a recess. In this manner, the bars 14 of the rotor circuit in the embodiment in FIG. 28 can be installed from the exterior of the rotor lamination 20 stack. Contrastingly, the rotor bars 14 in the embodiments of FIGS. 26 and 27 require the threading or inserting of the bars 14 internally through openings of the rotor lamination 20 stack.

In all three embodiments shown in FIGS. 26-28 a portion of the rotor circuit aligns or is substantially concentric with the d-axis. The approximate midpoint of the rotor circuit coincides with the d-axis. In this manner, in all the embodiments saliency is increased by virtue of the design. Finite-element analysis based modeling was conducting on various models of machines, both for electric machines not having any rotor circuit structure (i.e., related art) and for electric machines using embodiments of the rotor circuit structures of the present invention. Some results of the modeling are illustrated in FIGS. 21-24 herein.

Small signal saliency and small signal saliency angle is key information used for sensorless control, under aspects of the present invention, and it is defined using small signal impedance. Small signal impedance is defined for a small high frequency variation of current ($\Delta i_d$, $\Delta i_q$) from the operating point current vector ($i_d$, $i_q$). Small signal impedance varies depending on the orientation of the high frequency current variation ($\Delta i_d$, $\Delta i_q$). Small signal saliency at a given operating point ($\Delta i_d$, $\Delta i_q$) is the ratio of the maximum small signal impedance to the minimum small signal impedance over a full range of orientation of the high frequency current variation. Small signal saliency is greater than or equal to 1, and it is desired to be much larger than 1 for suitable sensorless control performance. Small signal saliency angle is the angular displacement of the maximum small signal impedance orientation from the rotor reference frame, for example the q-axis of the rotor reference frame. The small signal saliency angle is desired to be constant over the operating range, near zero for example, in order to achieve desired encoderless control performance.

Figure 21:
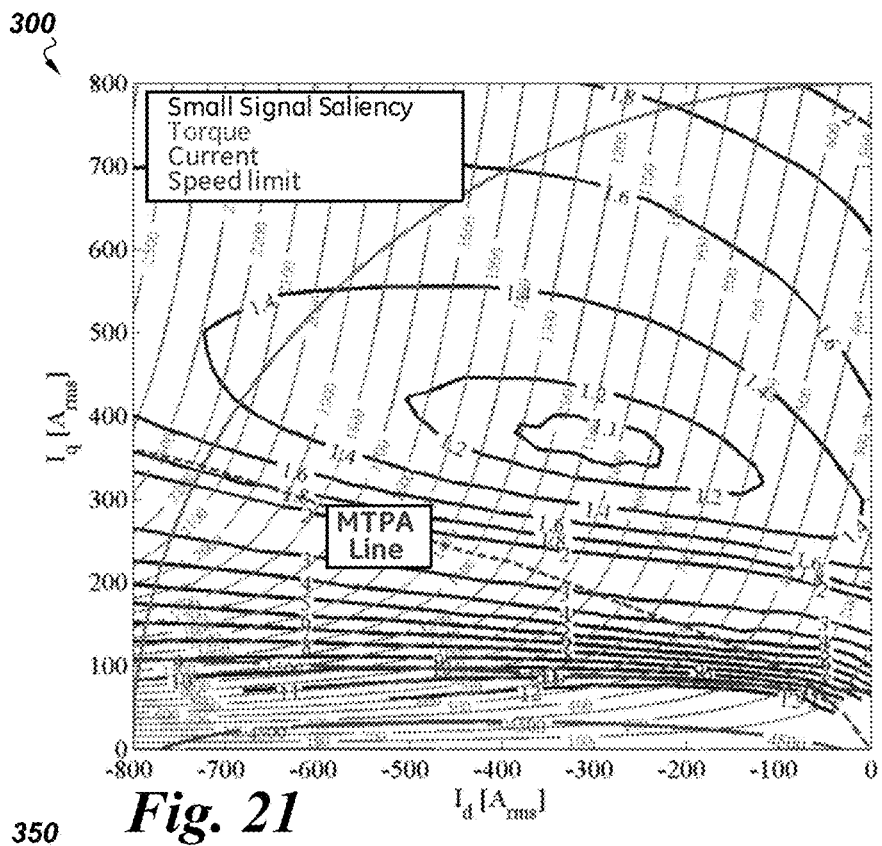
FIG. 21 is a graph illustrating small signal saliency for electric machine of the related art.
Figure 22:
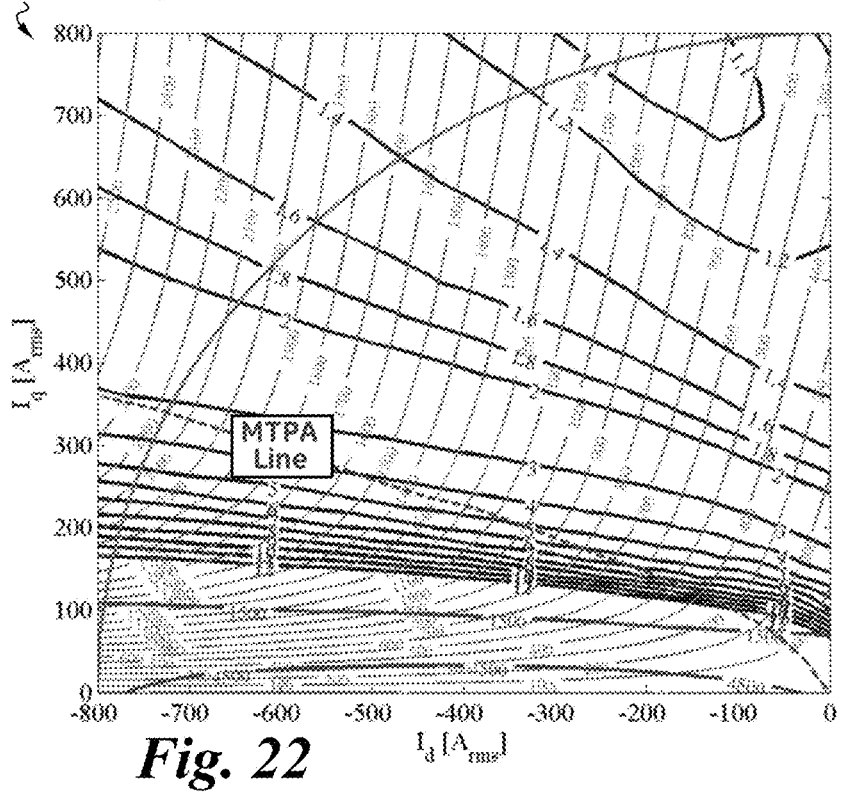
FIG. 22 is a graph illustrating small signal saliency for an electric machine with a rotor circuit structure, according to an embodiment of the present invention.

Referring to FIG. 21, a graph showing the small signal saliency on the current vector ($i_d$, $i_q$) plane for an IPM machine of the related art is depicted as element 300. Contrastingly, FIG. 22 shows the contour plots of small signal saliency of an IPM machine incorporating the component in accordance with the present invention as element 350. As shown in the graph, the resultant saliency is improved and increased as compared to the saliency in the related art machine (FIG. 21).

Figure 23:
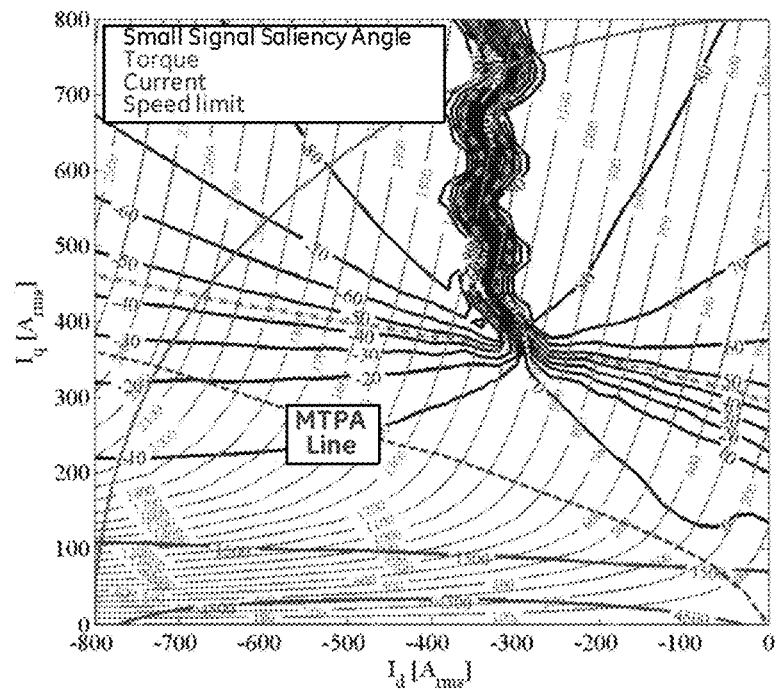
FIG. 23 is a graph illustrating small signal saliency angle for electric machine of the related art.
Figure 24:
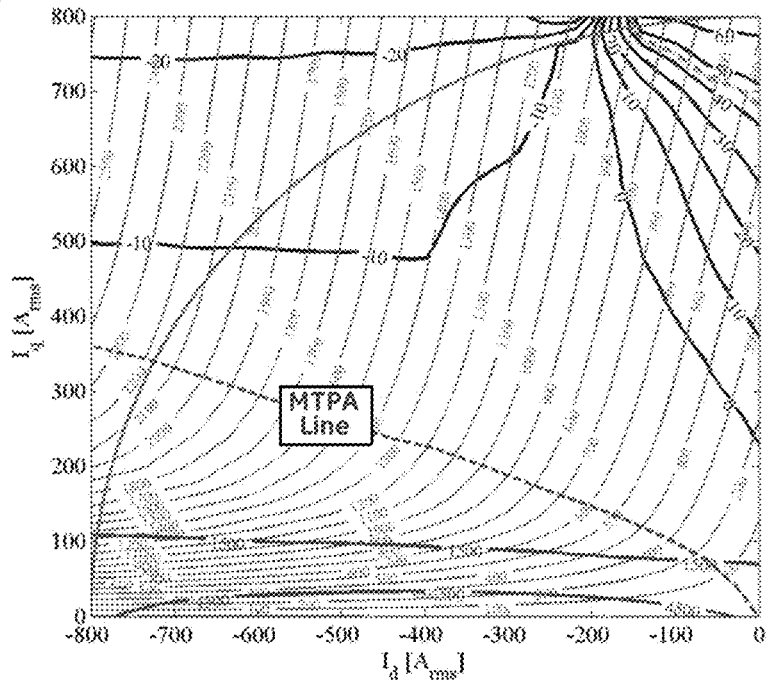
FIG. 24 is a graph illustrating small signal saliency angle for an electric machine with a rotor circuit structure, according to an embodiment of the present invention.

Referring to FIG. 23, a graph showing the contour plots of small signal saliency angle on the current vector ($i_d$, $i_q$) plane an IPM machine of the related art is depicted as element 400. Contrastingly, FIG. 24 shows the contour plots of small signal saliency angle of an IPM machine incorporating the component in accordance with the present invention as element 450. As shown in the graph, the resultant wide angular margin by using the component as compared to the related art machine (FIG. 23) depicting the very tight saliency angle.

Referring to FIG. 23, a graph showing the contour plots of small signal saliency angle on the current vector (id, iq) plane an IPM machine of the related art is depicted as element 400. Contrastingly, FIG. 24 shows the contour plots of small signal saliency angle of an IPM machine incorporating the component in accordance with the present invention as element 450. As shown in the graph, the resultant wide angular margin by using the component as compared to the related art machine (FIG. 23) depicting the very tight saliency angle.

Figure 25:
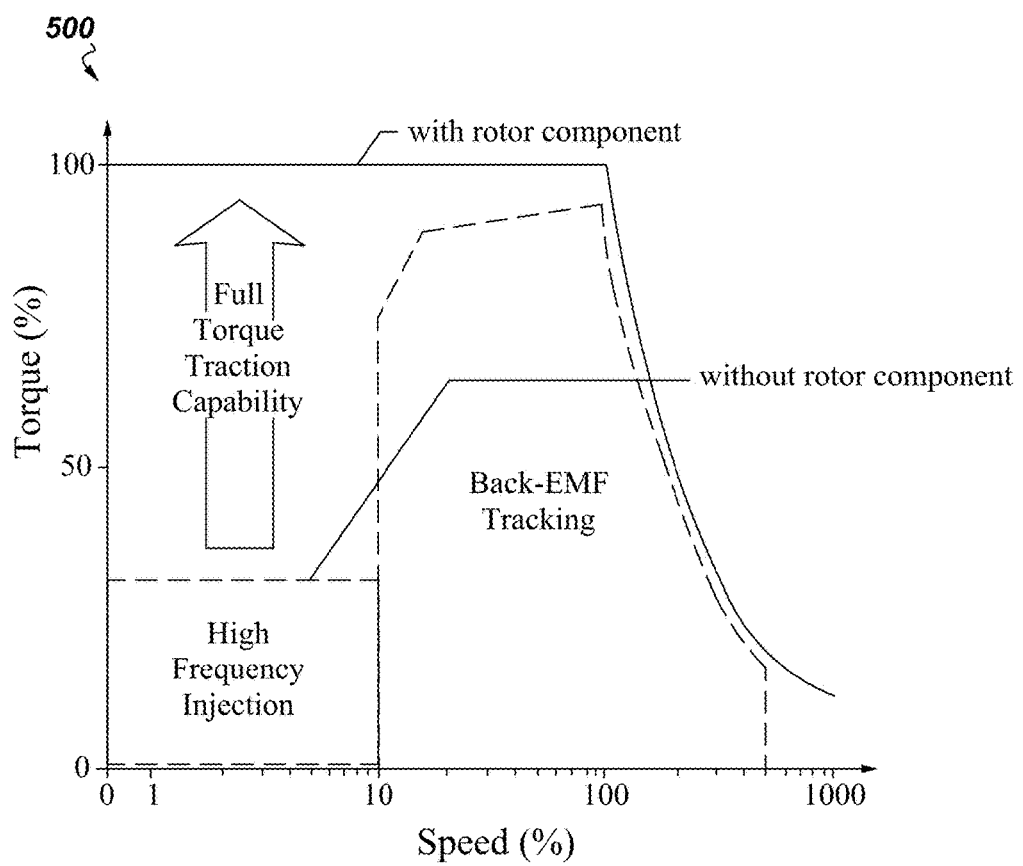
FIG. 25 is a schematic graph comparing motor speed and torque for a related art machine (without a rotor structure) and a machine with a rotor circuit structure, according to an embodiment of the present invention.

FIG. 25 shows a graph that depicts speed (%) on a x-axis vs. torque (%) on a y-axis. As shown, when a machine uses the component of the present invention the performance of the machine may reach the upper-left portion (i.e., dark upward pointing arrow) of the graph. That is by employing aspects of the present invention, full torque capability at lower machine speeds is attainable. (For example, an electric machine of the present invention may reach 50% of torque capability at speeds below 10% of the rated speed of the machine. In other embodiments, the electric machine may reach over 75% of torque capability at speeds below 10% of the rated speed of the machine. In still other embodiments, the electric machine may reach over 90% of torque capability at speeds below 10% of the rated speed of the machine. In still other embodiments, the electric machine may reach 100% of torque capability at speeds below 10% of the rated speed of the machine.)

Under aspects of the present invention, the components 10 and the electric machines 100 discussed herein may be used as a traction motor for virtually any vehicle. A vehicle support frame connected to the one or more electric machine 100. Suitable vehicles for use include, but are not limited to, an off-highway vehicle (OHV), a locomotive, a mining vehicle, electric-motorized railcar, automobiles, trucks, construction vehicles, agricultural vehicles, airport ground service vehicles, fork-lifts, non-tactical military vehicles, tactical military vehicles, golf carts, motorcycles, mopeds, all-terrain vehicles, and the like.

While the embodiments illustrated and described generally herein have shown that the electric machine 100 to be an interior permanent magnet (IPM) machine, other electric machines than those illustrated herein may employ aspects of the present invention including, for example, PMSRM, SRM, and induction machine, and the like. Various embodiments of the rotor circuit component 10 may be used in these various other types of electric machines.

Therefore, in accordance with one aspect of the invention, a rotor component comprises in accordance with one aspect of the invention, a rotor component comprises: a rotor circuit configured for use with one of an interior permanent magnet (IPM) machine and a synchronous reluctance machine (SRM), the rotor circuit comprising: at least one pole circuit, wherein the at least one pole circuit are made of a conductive, non-magnetic material and a midpoint of the least one pole circuit substantially aligns with a d-axis of the IPM or SRM.

In accordance with another aspect of the invention, an electric machine comprises: a rotor core; a stator configured with a plurality of stationary windings therein; a plurality of openings disposed within the rotor core; and a rotor circuit structure comprising at least one pole circuit disposed in a predetermined location, wherein said predetermined location is such that a midpoint of the least one pole circuit substantially aligns with a d-axis of the electric machine.

In accordance with another aspect of the invention, an electric machine comprises: a rotor core; a stator configured with a plurality of stationary windings therein; a plurality of openings disposed within the rotor core; a rotatable shaft therethrough; and a rotor circuit structure comprising at least one loop or ring of a conductive, non-magnetic material, wherein said at least one loop or ring is substantially concentric about a d-axis of the electric machine.

While only certain features of the invention have been illustrated and/or described herein, many modifications and changes will occur to those skilled in the art. Although individual embodiments are discussed, the present invention covers all combination of all of those embodiments. It is understood that the appended claims are intended to cover all such modification and changes as fall within the intent of the invention.

What is claimed is:

1. A rotor component having a shifted-ring configuration, comprising:
   a rotor core;
   a plurality of openings disposed within the rotor core;
   a plurality of permanent magnets disposed in the plurality of openings in such a way so as to define a remaining opening at each end of each of the plurality of permanent magnets; and
   a rotor circuit configured for use with one of an interior permanent magnet (IPM) machine and a synchronous reluctance machine (SRM), the rotor circuit comprising:
   at least one pole circuit, wherein the at least one pole circuit is disposed in a predetermined location, wherein said predetermined location is such that a midpoint of the least one pole circuit substantially aligns with a d-axis of the IPM or SRM, and wherein a portion of the rotor circuit structure and the plurality of permanent magnets are disposed in the same plurality of openings;
   a plurality of rotor bars disposed in one or more of the plurality of remaining openings; and
   a plurality of connection elements disposed in one or more of the plurality of remaining openings,
   wherein rotor bars from adjacent poles are co-located in one of the plurality of remaining openings.

2. An electric machine having a shifted-ring configuration, comprising:
   a rotor core;
   a stator configured with a plurality of stationary windings therein;
   a plurality of openings disposed within the rotor core;
   a plurality of permanent magnets disposed in the plurality of openings in such a way so as to define a remaining opening at each end of each of the plurality of permanent magnets; and
   a rotor circuit structure comprising at least one pole circuit including a plurality of rotor connectors inserted into the remaining opening of at each end of the permanent magnet and connected by a plurality of connection elements and disposed in a predetermined location, wherein said predetermined location is such that a midpoint of the least one pole circuit substantially aligns with a d-axis of the electric machine, and wherein rotor connectors from adjacent poles are co-located in one of the plurality of remaining openings.

3. The electric machine in claim 2, wherein the plurality of magnets are disposed in a plurality of rows.

4. An electric machine having a shifted-ring configuration comprising:
   a rotor core;
   a stator configured with a plurality of stationary windings therein;
   a first plurality of openings disposed within the rotor core;
   a plurality of magnets disposed in the first plurality of openings in such a way so as to define a remaining opening at each end of each of the plurality of permanent magnets;
   a rotatable shaft therethrough; and
   a rotor circuit structure comprising at least one loop or ring of a conductive, non-magnetic material and including a plurality of rotor bars disposed in one or more of the plurality of remaining openings, a plurality of connection elements disposed in one or more of the plurality of remaining openings, wherein rotor bars from adjacent poles are co-located in one of the plurality of remaining openings, and wherein said at least one loop or ring is substantially concentric about a d-axis of the electric machine, and wherein a portion of the rotor circuit structure.

5. The electric machine of claim 4, wherein the plurality of magnets are disposed in a plurality of rows.

6. The electric machine in claim 4, the rotor core further comprising a second plurality of openings.

* * * * *